(12) United States Patent
Inaba

(10) Patent No.: US 7,493,037 B2
(45) Date of Patent: Feb. 17, 2009

(54) DIGITAL STEREO CAMERA/DIGITAL STEREO VIDEO CAMERA, 3-DIMENSIONAL DISPLAY, 3-DIMENSIONAL PROJECTOR, AND PRINTER AND STEREO VIEWER

(76) Inventor: Minoru Inaba, No. 1116, Oaza Samukawa, Oyama, Tochigi-ken (JP)

( * ) Notice: Subject to any disclaimer, the term of this patent is extended or adjusted under 35 U.S.C. 154(b) by 488 days.

(21) Appl. No.: 11/233,719

(22) Filed: Sep. 23, 2005

(65) Prior Publication Data

US 2006/0204239 A1    Sep. 14, 2006

(30) Foreign Application Priority Data

Mar. 10, 2005  (JP) .............................. 2005-067524
Apr. 19, 2005  (JP) .............................. 2005-121710

(51) Int. Cl.
  *G03B 35/00*  (2006.01)
  *G03B 41/00*  (2006.01)
(52) U.S. Cl. ...................... 396/324; 396/333
(58) Field of Classification Search ................ 396/322, 396/324, 325, 333, 338, 339, 340; 348/42, 348/47, 51; 352/57, 60, 86; 353/7
See application file for complete search history.

(56) References Cited

U.S. PATENT DOCUMENTS 5,879,064 A * 3/1999 Inaba .............................. 353/7
5,947,575 A * 9/1999 Inaba .............................. 353/9

* cited by examiner

*Primary Examiner*—Rodney E Fuller
(74) *Attorney, Agent, or Firm*—Fattibene and Fattibene; Paul A. Fattibene; Arthur T. Fattibene

(57) ABSTRACT

A matching adjustment between left and right screens is easily and accurately performed in a digital stereo camera and/or a digital stereo video camera at or after the time of photographing. A stereo viewfinder 3 of a digital stereo camera 1 comprises a pair of left and right liquid crystal displays and eyepiece lenses 10. Aspect ratios of left and right image display regions of the liquid crystal displays is made narrower than aspect ratios of image capture regions of image capture devices and horizontal scrolling is performed symmetrically. Images on the image capture devices are horizontally scrolled, while finder images are viewed in a stereoscopic manner with both eyes, so that perspective of a stereoscopic image changes and an optimally scrolled image data can be photographed. Scroll adjustment can be performed on image data after being photographed, and stereo photographs giving an optimal stereoscopic feeling can be printed from edited image data.

32 Claims, 15 Drawing Sheets

# DIGITAL STEREO CAMERA/DIGITAL STEREO VIDEO CAMERA, 3-DIMENSIONAL DISPLAY, 3-DIMENSIONAL PROJECTOR, AND PRINTER AND STEREO VIEWER

BACKGROUND OF THE INVENTION

1. Field of the Invention

The present invention relates to a digital stereo camera/digital stereo video camera, a 3-dimensional display, a 3-dimensional projector, and a printer and a stereo viewer, and in particular to a digital stereo camera or a digital stereo video camera, a 3-dimensional display, a 3-dimensional projector, and a printer and a stereo viewer which achieve improvement in reproducibility of a 3-dimensional stereoscopic image.

2. Description of the Prior Art

There has been a long history in a 3-dimesional (3-D) stereo photograph or a 3-D stereo motion picture where a viewer or observer can view a stereoscopic image by watching two images with different viewpoints photographed at places spaced to right and left individually at his/her left and right eyes. In order to obtain a preferable stereoscopic effect in the stereo photographic, it is important to achieve positional matching between a left image and a right image. When a mismatching occurs, the stereoscopic effect is reduced or diminished, or considerable visual fatigue is given to a viewer.

In a conventional stereo camera or stereo slide of a silver halide film type, many means for taking matching at a photographing time or means for taking matching when a film is mounted on a slide mount have already been proposed by the assignee of the present application (Japanese Patent No. 2880131, Japanese Patent No. 2880132, Japanese Patent No. 3370051, and the like).

As a technique for a stereo photograph in a digital camera, for example, there is a proposal about a technique where a prism type stereo adapter having two set of left and right mirrors is attached to a photographing lens of an ordinary digital camera having one photographing lens, and a stereo photograph is taken by projecting images incident on the left and right mirror on respective left and right halves of an image-capture device in a divisional manner (Japanese Patent Application No. 2001-341789)

As a 3-D motion picture appreciating method where a viewer appreciates a 3-D stereo motion picture projected on a projection screen by a liquid crystal projector, such a method have been conventionally implemented that a linear polarizing processing where a left eye side image and a right eye side image are orthogonal to each other or a circular polarizing processing where rotating directions are reverse to each other and an image is projected on a projection screen is performed, a viewer uses glasses having linear polarizing filters or circular polarizing filters corresponding to the image on the left eye side and the right eye side to separate the image entering in both the left and right eyes into a left side eye image and a right side eye image thereby appreciating a 3-D stereoscopic image.

When a scanning type electronic display such as a CRT or a liquid crystal display is used, a 3-D cinema system where in an interlace scanning constituting one frame with two fields, a motion picture is displayed by alternately scanning a left eye side image and a right side eye image for each one field, and when a viewer watches a screen wearing liquid crystal shutter glasses with a left side liquid crystal shutter and a right side liquid crystal shutter alternately opened and closed so that a left side image appears on his/her left eye and a right side image appears on his/her right eye is known (for example, see JP-A-H10-133801).

For a stereo photograph, it is important to obtain a positional matching between a pair of left and right images (adjustment of a distance where a viewer can see a stereo-composite image). Regarding the matching, however, since there are also various factors affecting visual matching including not only positions of main subject images on left and right images but also a photographing distance to the main subject or a distance between optical axes of left and right photographing lenses, a positional relationship between the main subject image and other subject images or a background, and the like, it is difficult to obtain an optimal matching by performing a uniform adjustment.

That is, in order to produce a stereo photograph with quality higher than that of a stereo photograph to which matching adjustment has not been performed, the stereo photograph to which coarse matching adjustment has been performed, or the like, it is necessary to perform adjustment to stereoscopic feeling for each one photographing or for each production of a pair of stereo photo-prints or stereo slides. There is a similar requirement in the 3-D cinema, where matching adjustment should be performed for each one scene. However, it seems that an art about a digital stereo camera or 3-D projector provided with a matching adjusting unit or means which can attain adjustment to a complete state has not been known at this time.

Therefore, a technical problem to be solved arises in order to perform matching adjustment of left and right screens for a pair of stereo photographs or for each one scene of a 3-D cinema at a photographing time or after photographing easily and accurately. An object of the present invention is to solve the above problem.

Another object of the invention is to allow accurate matching adjustment such that a distance relationship between a stereoscopic image and "a stereo window" (one virtual window through which right and left image frames appear at a certain distance in conformity with each other) is made easily visible at a photographing time or at a time of matching adjustment between left and right screens after photographing.

A conventional digital silver halide print system used in a photo shop or the like does not accommodate a stereo photograph, and can not perform matching adjustment between left and right screens at a printing time. Still another object of the invention is to provide a printer which allows easy accurate matching adjustment between left and right screen at a printing time, allows printing of one sheet of stereo photograph on which a pair of left and right images have been arranged properly, and can provide stereo photograph print service at a photo shop or the like

SUMMARY OF THE INVENTION

The present invention has been proposed in order to achieve the above object, and there is provided a digital stereo camera/digital stereo video camera which is provided with a pair of left and right photographing optical systems, one or two image capture devices which individually receive a pair of images through the pair of photographing optical systems, a pair of left and right electronic displays which individually display a pair of images projected on one or two the photographing elements in an erecting manner, and an eyepiece lens, comprising: a unit that, when a photographed image is displayed on the pair of left and right electronic display, sets aspect ratios of image display areas on the electronic displays to be narrower than aspect ratios of images projected on the one or two image capture devices to perform displaying while masking one portions of the images on the one or two image capture devices as a mask; a manual scrolling unit that horizontally scrolls images on the pair of left and right electronic displays symmetrically regarding the left and right to changes a spacing between equal subject images on the left and right image display regions; and a unit that saves image data equal to a display image horizontally scrolled arbitrarily as a set of stereo image data elements and a unit that outputs the set of stereo image data elements externally.

Since the digital stereo camera/digital stereo video camera of the present invention allows horizontal scrolling of a pair of left and right images displayed on the electronic displays which is symmetrical with the left and right to shoot or save the images as an arbitrary scrolling state in a stereo viewfinder with an electronic display configuration, a user or an operator can photograph an image at its optimal stereoscopic state while looking through the finder to scroll images horizontally or he/she can conduct edition after photographing so he/she can produce a stereo photograph or stereo cinema with a high quality.

Such a configuration can be adopted that data of an original image projected on the pair of left and right image capture devices and scroll data obtained when horizontal scrolling is performed arbitrarily are saved or outputted externally.

When a distance or spacing between equal subject images on the pair of left and right image display regions are reduced symmetrically regarding the left and right by the manual scrolling unit and outside ends of respective photographed images are caused to coincide with outside ends of the image display regions on the electronic displays, a distance between optical axes of the left and right photographing lens is set such that a distance between infinite subject images on the left and right image display regions is larger than a distance between the centers of the left and right image display regions, so that a screen loss can be reduced when a stereoscopic spacing can be adjusted according to scrolling.

When the digital stereo camera/digital stereo video camera is further provided with a display control unit which horizontally scrolls left and right display images on the electronic displays symmetrically with the left and right in an interlocking manner with focus adjustment of the photographing lens to control a scroll amount such that a distance between the centers of equal subject images positioned on a focused focal length on the left and right image display regions on the electronic displays is equal to a distance between the centers of the left and right image display regions, operation to be performed at a photographing time can be made considerably easy.

In this case, when such a configuration is employed so as to control a horizontal scroll amount that, when the focused focal length is about 1 meter or farther, the distance between the centers of the equal subject images positioned at the focused focal lengths on the left and right image display regions on the electronic displays is larger than the distance between the centers of the left and right image display regions, and when the focused focal length is less than about 1 meter, the distance between the centers of the equal subject images positioned at the focused focal point become equal to the distance between the centers of the left and right image display regions, a screen loss in a photographable focal length range can be minimized.

By displaying collimation patterns with equal shapes and equal positions on the left and right electronic displays in an overlapping manner with images, change in stereoscopic view at a manual scrolling time can be grasped easily and focusing is made easy. When the collimation pattern is formed of a plurality of vertical lines, the highest visibility to a status change can be obtained.

By saving image data which does not include a display signal for the collimation pattern as a set of stereo image data elements or outputting the same externally, the collimation pattern is prevented from being outputted in an overlapping manner with an image at an appreciating time of stereo images or at a printing-out time of stereo images so that any problem does not occur in an image or hard copy.

When the digital stereo camera/digital stereo video camera is further provided with a display control unit which senses operation start of an operation switch or an operation key provided on the manual scroll unit to display the collimation pattern and stops displaying the collimation pattern after the operation switch or the operation key is released or after a predetermined time elapses after the operation start, the collimation pattern is automatically displayed only when it is required, which results in excellent operability.

When such a constitution is employed that a data communication interface connected to a cellar or portable phone, a cellar or portable phone module, or a telephone modem is incorporated in the digital stereo camera/digital stereo video camera so that transmission and reception of data can be performed through a telephone line, stereo image communication can be performed in real time.

According to another aspect of the invention, there is provided a digital stereo camera/digital stereo video camera constituted such that an image capture unit provided with a pair of two left and right photographing optical systems and an image capture device and a stereo viewfinder provided with a pair of left and right electronic displays and an eyepiece lens are attachably/detachably provided, a control unit or an external storage device is provided in one of the image capture unit and the stereo viewfinder, or the control unit or the external storage device is provided separately therefrom, and the image capture unit and the stereo viewfinder, and the control unit and the external storage device are electrically connected so that communication of image data, a control signal and the like is performed.

By providing a control unit which images corresponding to the pair of left and right stereo image data elements in parallel and performs outputting as a pair of stereo image print data elements in an overlapping manner with data of a line or a pattern surrounding a pair of left and right images or a rectangular cutting guide frame obtained by painting, a stereo photo card can be completed by cutting a printed photo paper along the guide frame. By forming each of left and right end portions of the cutting guide frame in an arc shape, loading to and unloading from a stereo photo viewer are made easy.

According to still another aspect of the invention, there is provided a 3-dimensional display constituted such that a left eye side image and a right eye side image are alternately displayed, for each one field in an interlace manner using an electronic display such as a CRT or a PDP and an image on the display can be viewed in a stereoscopic manner using a viewer provided with a pair of left and right liquid crystal shutters opened and closed in synchronization with a field switching timing of the display, comprising: a unit that sets an aspect ratio of an image corresponding to an original motion picture to be narrower than an aspect ratio of a display image to perform projection while masking a portion of the original motion picture; a manual scroll unit which horizontally scrolls a left eye side image and a right eye side image on a display region on the electronic display symmetrically regarding the left and right to change a distance between equal subject images on the left eye side image and the right eye side image; and an edition data saving unit which writes motion picture data put in a state equal to the left eye side image and the right eye side image horizontally scrolled arbitrarily in an external storage device as a set of stereo video data elements.

According to still another aspect of the invention, there is provided a 3-dimensional projector which uses liquid crystal projectors of two right and left systems whose polarizing directions of emitted lights are orthogonal to each other, digital micro-mirror device (trademark) system projectors of two left and right systems attached with linear polarizing filters whose polarizing directions are orthogonal to each other, or the like to project a left eye side image and a right eye side image on a projection screen from the projectors of the two left and right systems in an overlapping manner, where an image on the projection screen is viewed in a stereoscopic manner using glasses provided with linear polarizing filters whose polarizing directions are orthogonal to each other at both left and right eyes/a 3-dimensional projector which uses liquid crystal projectors of two right and left systems attached with circularly polarizing filters whose rotating directions of circularly polarized lights are reverse to each other, digital micro-mirror device (trademark) system projectors of two left and right systems attached with circularly polarizing filters whose rotating directions of circularly polarized lights are reverse to each other, or the like to project a left eye side image and a right eye side image on a projection screen from the projectors of the two left and right systems in an overlapping manner, where an image on the projection screen is viewed in a stereoscopic manner using glasses provided with linear polarizing filters where rotating directions of circularly polarized lights are reverse to each other at both left and right eyes, comprising: a unit which sets an aspect ratio of an image corresponding to an original motion picture to be narrower than an aspect ratio of a display image to perform projection while masking a portion of the original motion picture; a manual scroll unit which horizontally scrolls a left eye side image and a right eye side image on the projection screen symmetrically regarding the left and right to change a distance between equal subject images on the left eye side image and the right eye side image on the projection screen; and an edition data saving unit which writes motion picture data put in a state equal to the left eye side image and the right eye side image horizontally scrolled arbitrarily in an external storage device as a set of stereo video data elements.

Since the 3-dimensional display and the 3-dimensional projector can horizontally scroll a pair of left and right images displayed on the electronic displays or the screen symmetrically with the left and right to edit the images in an arbitrary scrolling state, a 3-dimensional stereo cinema with a high quality which can attain a proper stereoscopic effect can be appreciated.

When the 3-dimensional display or the 3-dimensional projector is provided with a unit which projects a collimation pattern on the left and right electronic displays or the projection screen in an overlapping manner on an image, adjustment of a stereoscopic effect can be facilitated during motion picture edition. When the collimation pattern is constituted of a plurality of vertical lines, it has the most excellent visuability.

When the 3-dimensional display or the 3-dimensional projector is provided with an edition point designating unit which can perform motion picture edition for each frame, a stereoscopic effect can be adjusted for each one scene.

When the 3-dimensional display or the 3-dimensional projector is provided with an image data outputting unit which outputs an arbitrary frame of stereo video data edited and saved as a pair of left and right stereo photograph data elements externally, any one screen included in motion picture can be printed out.

According to still another aspect of the invention, there is provided a printer which produces one sheet of stereo photo print on which a pair of left and right images have been displayed in parallel based upon stereo image data constituted of a pair of left and right image data elements, and which is provided with one or a pair of left and right electronic displays which display a pair of left and right images corresponding a set of stereo image data elements stored in a printer memory in an erected state and in parallel at a spacing approximately equal to a spacing between a left eye and a right eye of a human, comprising: a unit which sets an aspect ratio of an image on the electronic display to be narrower than an aspect ratio of an image corresponding to stereo image data to perform displaying while masking a portion of an original image; a manual scrolling unit which horizontally scrolls a pair of left and right images on the electronic display symmetrically regarding the left and right to change a spacing between equal subject images on the left and right images; and an edition data writing unit which writes image data in a state equal to a display image arbitrarily scrolled in the printer memory as a set of stereo image print date elements.

According to the printer, since the stereoscopic effect adjustment (matching adjustment between left and right images) can be performed in a printing stage, a stereo photo print with an optimal stereoscopic effect can be produced even from an image photographed by a digital stereo camera which does not include a stereoscopic effect editing function.

When the printer is provided with a unit which displays collimation patterns with equal shapes and equal positions on the left and right image display regions on the electronic display in an overlapping manner on images during image editing, a stereoscopic effect can be adjusted accurately.

When the printer is provided with a control unit which performs printing in an overlapping manner with data of a line or a pattern surrounding a pair of left and right images, or a rectangular cutting guide frame obtained by painting, a stereo photo card is completed by cutting a printed photo paper along the guide frame. By forming each of both left and right end portions of the cutting guide frame in an arc shape, loading to and unloading from a stereo photo viewer is facilitated.

A printer constituted to be connected with an external storage device such as a removable memory or a removable disk so as to allow reading, editing and writing of image data is provided.

A printer which is fixedly or attachably/detachably provided with a partitioning plate which isolates left and right images from each other visually on one or a pair of left and right electronic displays which display a pair of left and right images corresponding to stereo photograph data stored in a printer memory in an erected state and in parallel at a spacing approximately equal to a spacing between a left eye and a right eye of a human is provided. By providing the partition plate to isolate viewing fields of left and right eyes from each other, images on a pair of left and right electronic displays can be viewed in a stereoscopic manner with both the eyes.

By arranging a pair of left and right eyepiece lenses on a front face of the electronic displays, even details on an image can be viewed so that accuracy in matching adjustment can be improved.

According to still another aspect of the invention, there is provided a stereo viewer comprising: a lens board attached with a pair of left and right eyepiece lenses and a print holder portion in which a stereo photo print on which a pair of left and right images have been displayed in parallel is inserted, wherein respective intermediate portions of the lens board and the print holder portion in a horizontal direction are coupled to each other using a partition plate for viewing field separation, the print holder portion is provided with a pair of left and right windows corresponding to a pair of left and right image display regions of an electronic display of the printer and is provided with a coupling mechanism for mounting on a front face of the electronic display.

When a stereo viewer for observing stereo images on a monitor display on the printer is attachably/detachably provided, even a printing processing for an ordinary photograph which is not a stereo photograph can be accommodated, and a stereo viewer detached can be utilized as a viewer for appreciating a stereo photo print alone.

BRIEF DISCRIPTION OF THE DRAWINGS

Figure 6:
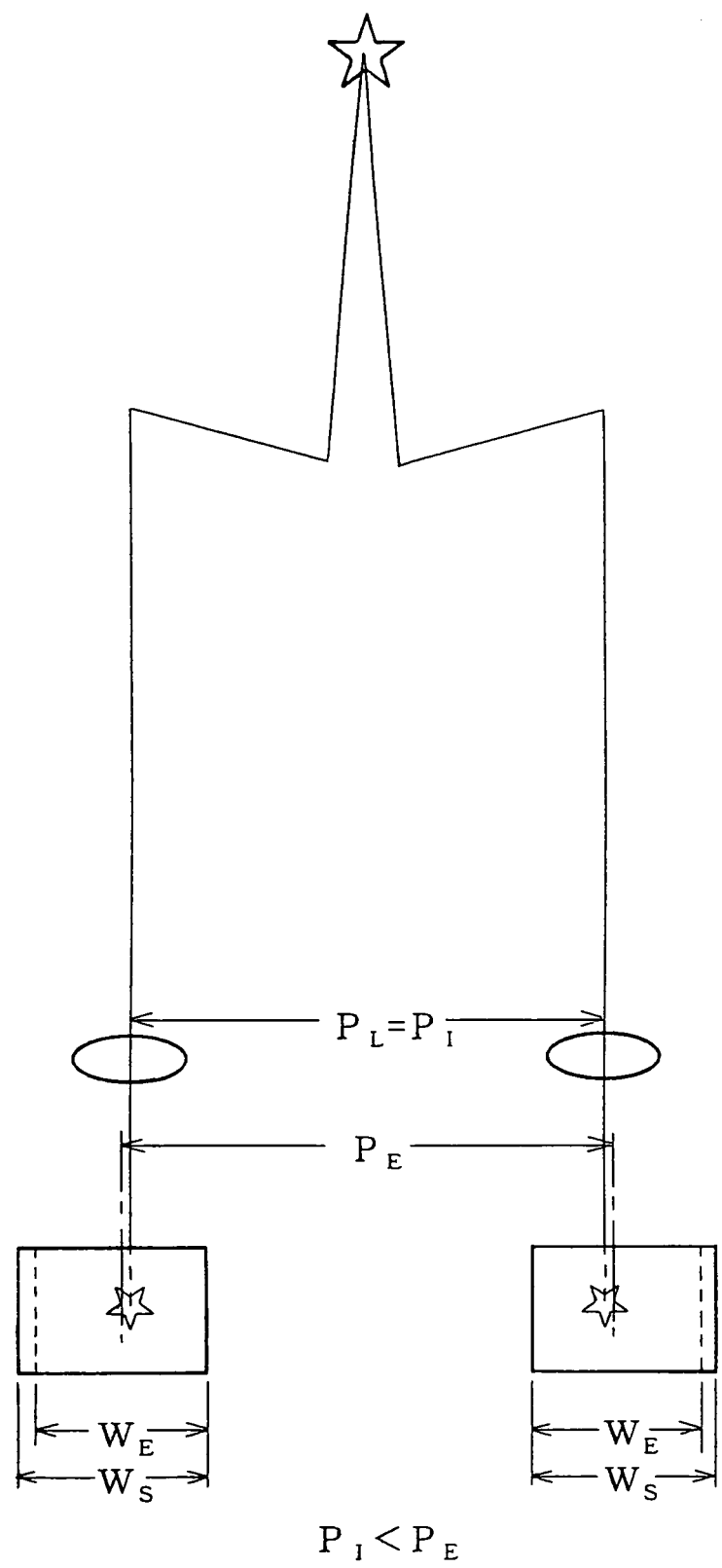
Figure 9:
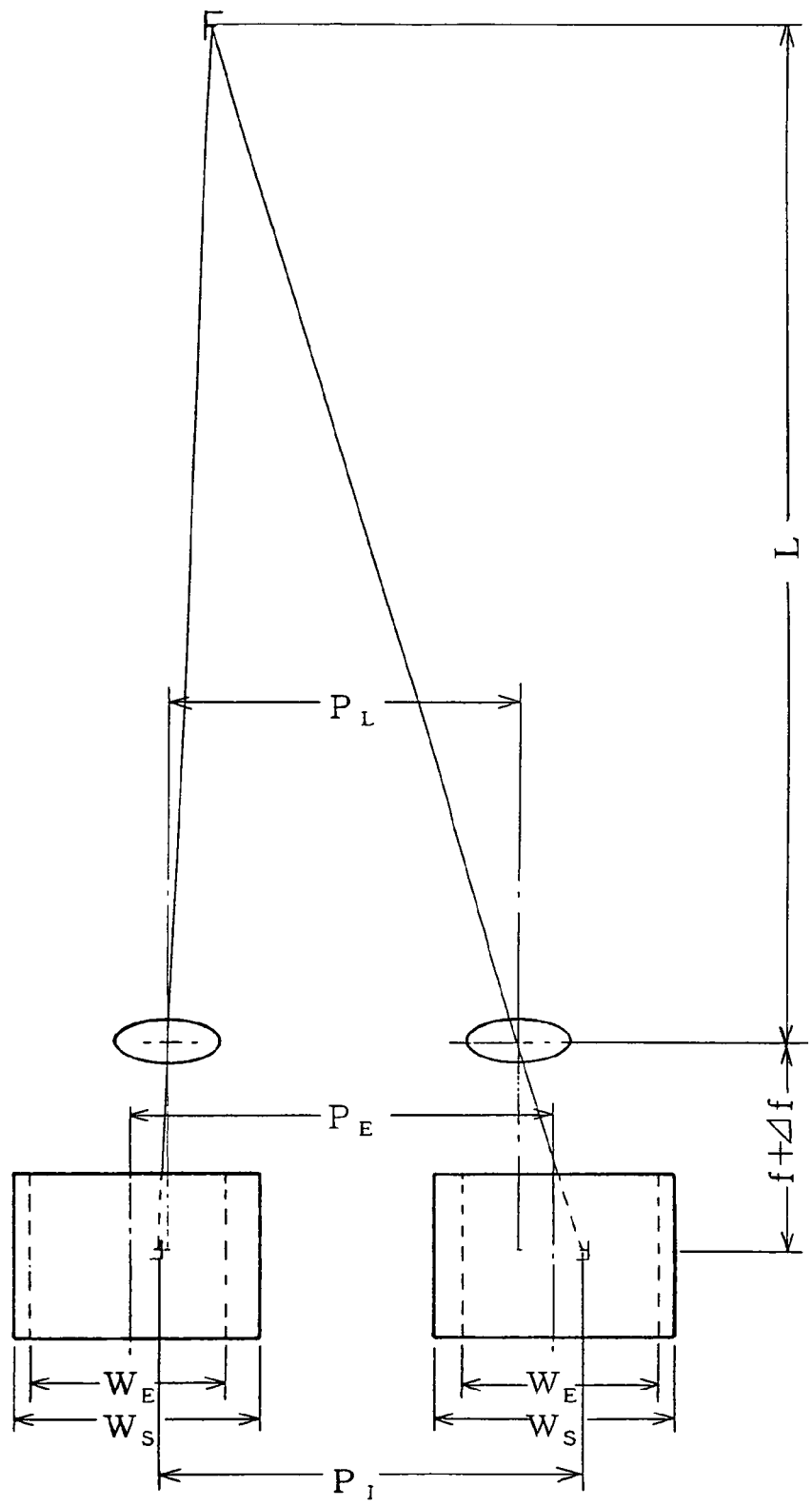
Figure 10:
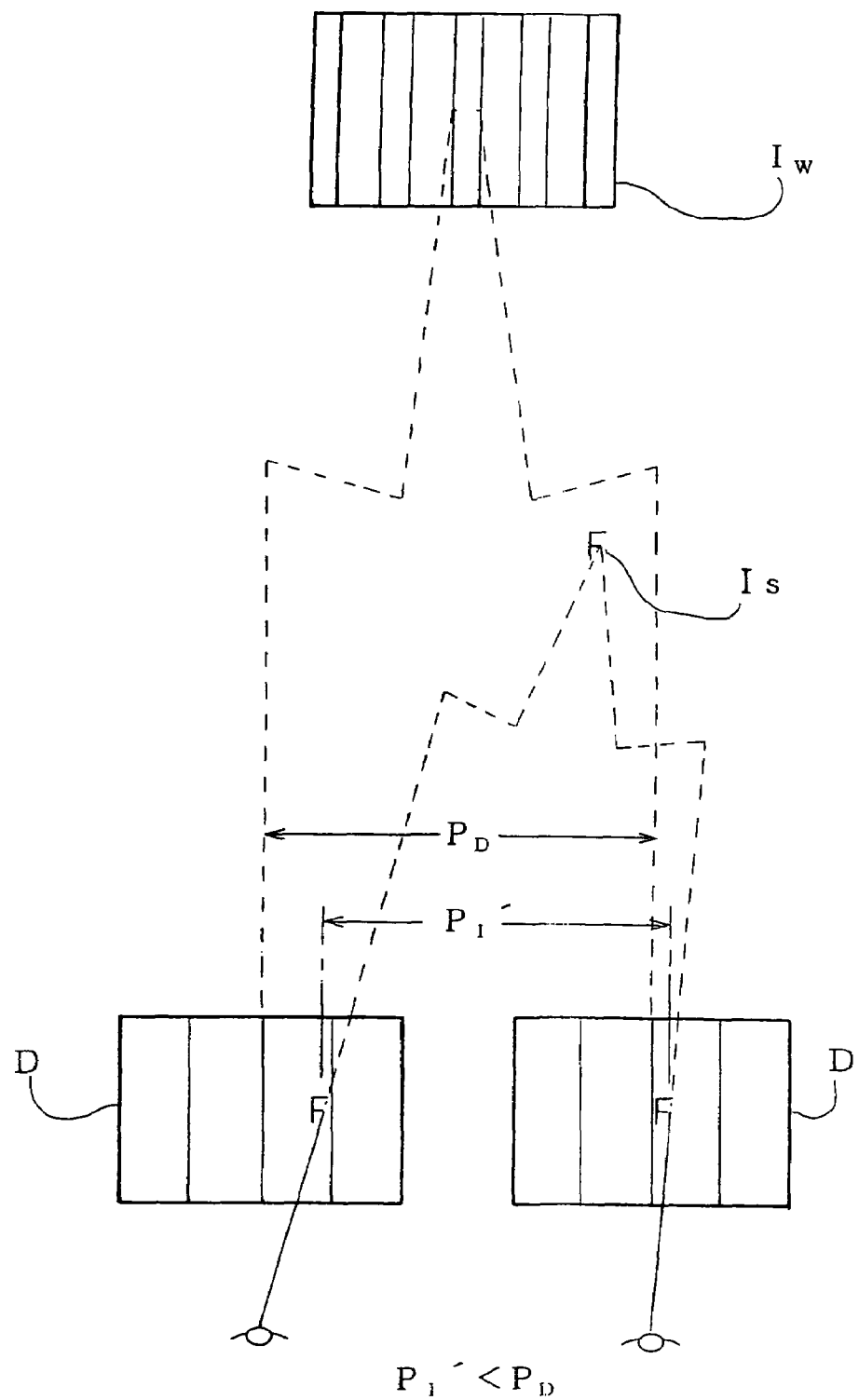
Figure 11:
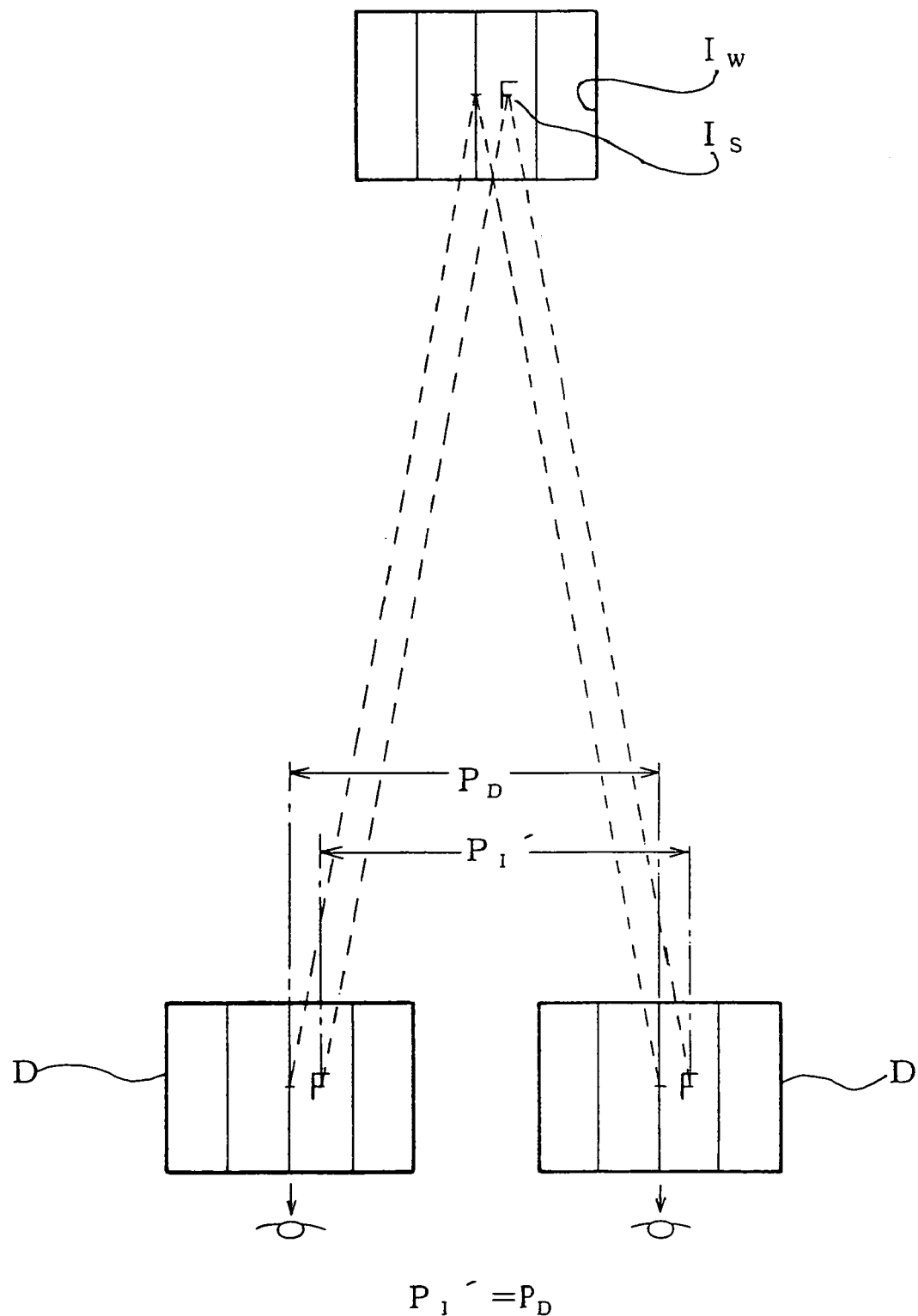
Figure 12:
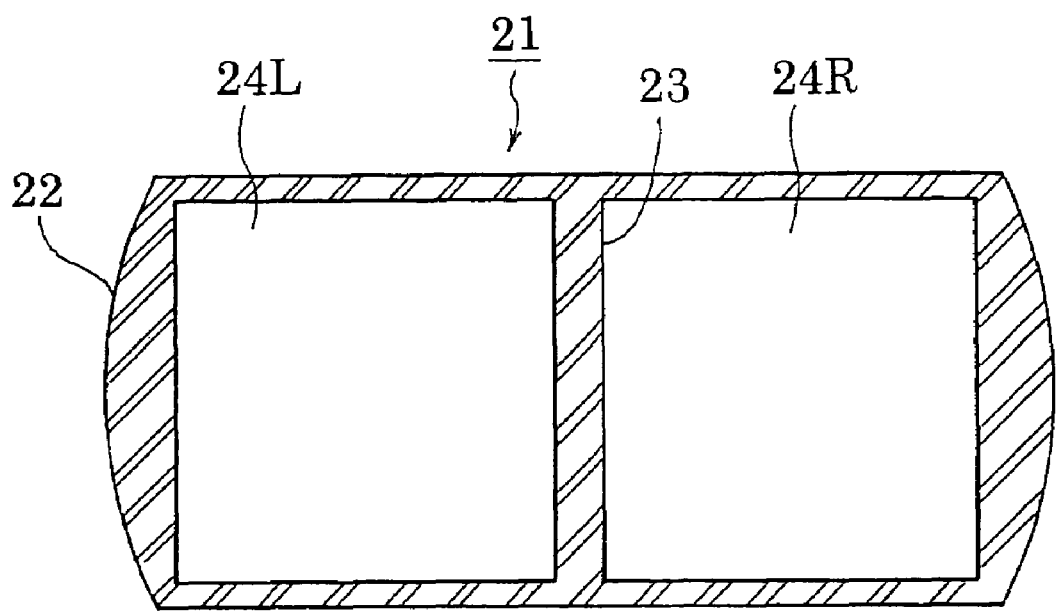
Figure 13:
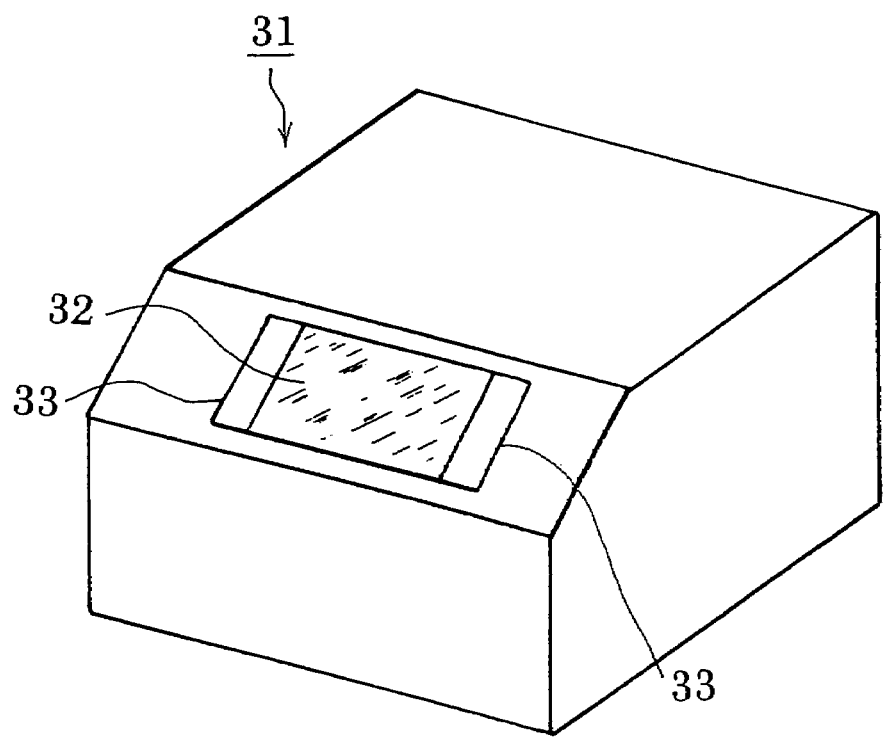
Figure 13:
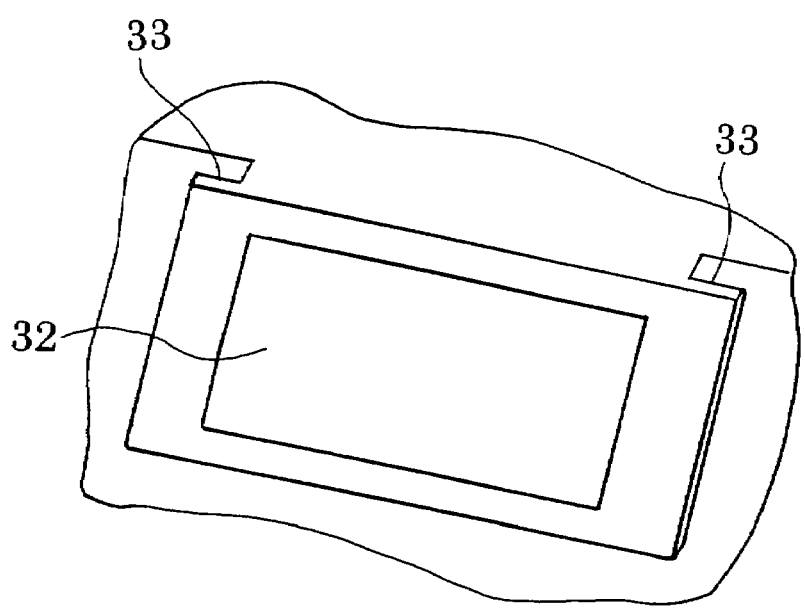
Figure 14:
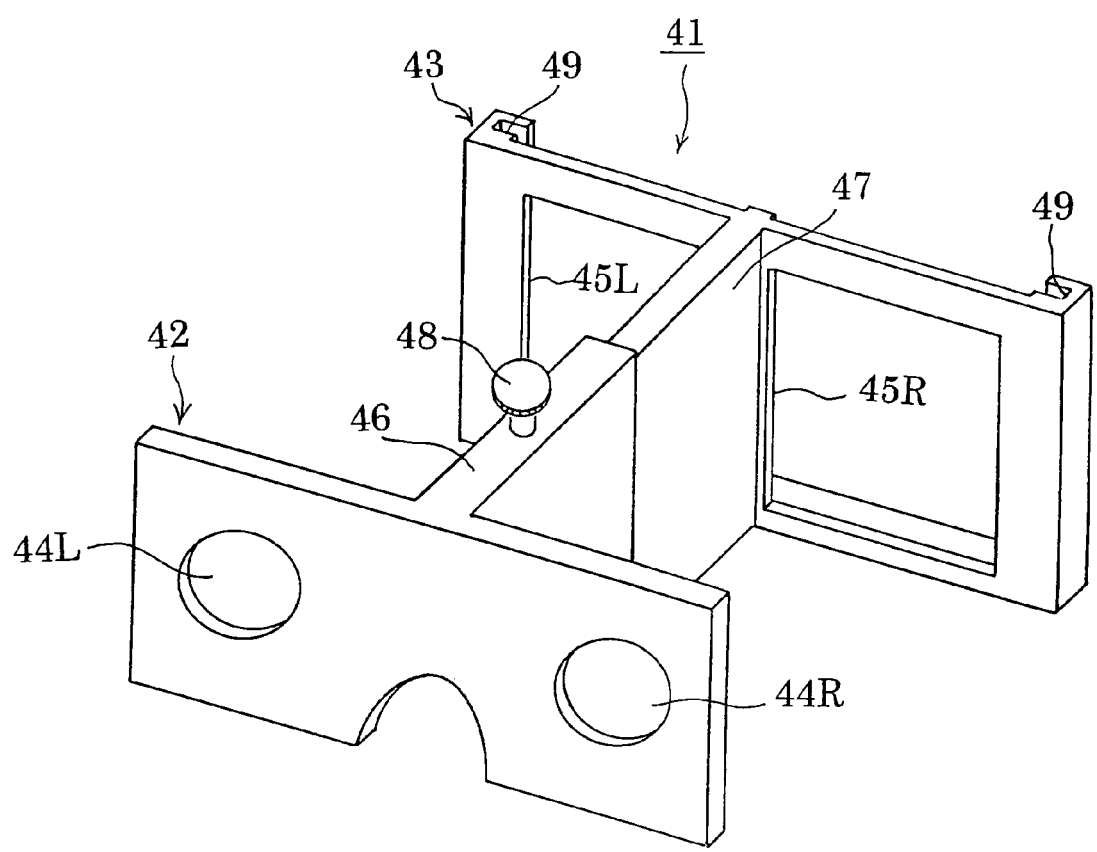
Figure 15:
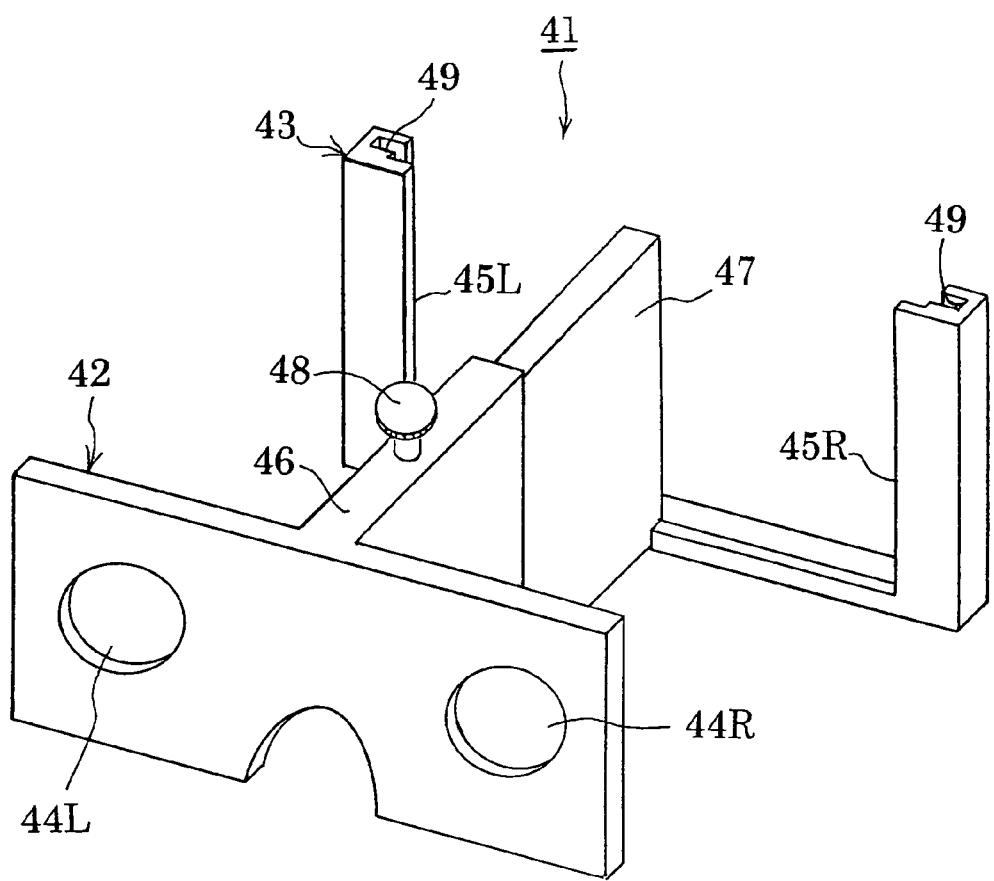

FIGS. 5A, 5B, 5C, and 5D are explanatory diagrams of a matching adjusting function of the digital stereo camera of the invention;

FIG. 6 is an explanatory diagram for explaining a screen loss solving unit in the stereo camera;

FIGS. 7A, 7B, and 7C are explanatory diagrams for explaining a matching adjustment range according the stereo camera shown in FIG. 6;

FIGS. 8A and 8B are explanatory diagrams showing stereo viewfinder images displayed with vertical line collimation pattern;

FIG. 9 is an explanatory diagram showing a matching adjustment behavior in the digital stereo camera;

FIG. 10 is an explanatory diagram showing a stereoscopic image forming behavior in the stereo camera;

FIG. 11 is an explanatory diagram showing a stereoscopic image forming behavior in the stereo camera;

FIG. 12 is a front view of a stereo photo print;

FIG. 13A is a perspective view of a printer according to the invention, and FIG. 13B is an enlarged view of a monitor display portion of the printer;

FIG. 14 is a perspective view of a stereo viewer according to the invention; and FIG. 15 is a perspective view showing another embodiment of the stereo viewer.

DESCRIPTION OF THE PREFERRED EMBODIMENTS

Figure 1:
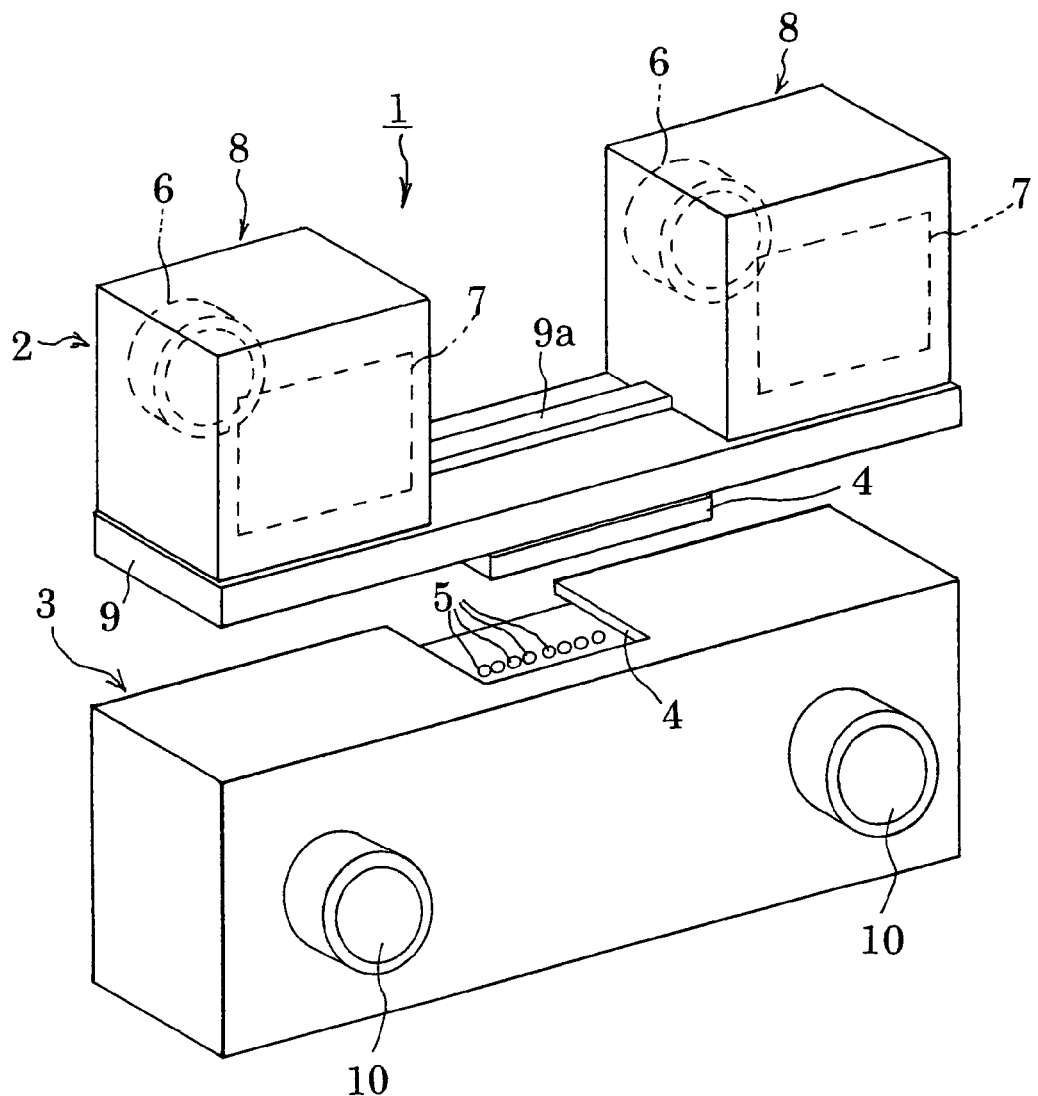
FIG. 1 is a perspective view showing an embodiment of a digital stereo camera of the present invention.

FIG. 1 shows one example of a digital stereo camera of the present invention. A digital stereo camera 1 is provided with an image capture unit 2 and a stereo viewfinder 3, and the stereo viewfinder 3 having a matching adjustment function for a stereoscopic view (a function of masking a left or right end portion of an image) and the image capture unit 2 are coupled to each other by a fitting mechanism 4 such as, for example, a hot shoe or accessory shoe of an ordinary camera, and they are electrically connected to each other via an electric contact point 5 disposed in the fitting mechanism. The image capture unit 2 and the stereo viewfinder 3 are separated from each other during editing after photographing, so that matching adjustment of the stereo viewfinder 3 can be performed alone.

The image capture unit 2 is constituted of two digital cameras 8, each being provided with a photographing lens 6 and a CCD image capture device 7 (hereinafter, simply called "an image capture device 7"), and a base 9 supporting the two digital cameras 8. A pair of left and right digital cameras 8 are engaged with a guide rail portion 9a on an upper face of the base 9, so that the digital cameras 8 can be slid along the guide rail portion 9a and they can be locked at any positions by a locking mechanism (not shown). It is especially advantageous in close distance photographing that a distance between optical axes of the left and right digital cameras 8 can be adjusted in this manner. This is because the distance between the optical axes set to a standard or ordinary distance or spacing between both eyes of a human often becomes excessive at a close distance photographing time, which results in requirement for a further reduced distance between the optical axes.

The stereo viewfinder 3 is provided in a body thereof with a pair of left and right TFT color liquid crystal displays (not shown), and images on the pair of left and right TFT color liquid crystal displays (hereinafter, simply called "a liquid crystal display") can be individually observed through a pair of left and right eyepiece lenses 10. Though not illustrated, a display driving circuit, a display control portion provided with a stereoscopic view feeling editing function described later, and the like are incorporated into the body, and a removable memory for storing image data, such as SD memory card®, Compact Flash®, or Smart Media®, and a power source battery are attached to exclusive slots, respectively. A power source switch, a shutter button, an editing operation key, video signal output terminals, USB terminals are arranged at proper positions on an outer peripheral face of the body. A ferroelectric liquid crystal micro-display may be used instead of the TFT color liquid crystal display. Even in this case, similar function and advantage can be achieved.

Figure 2:
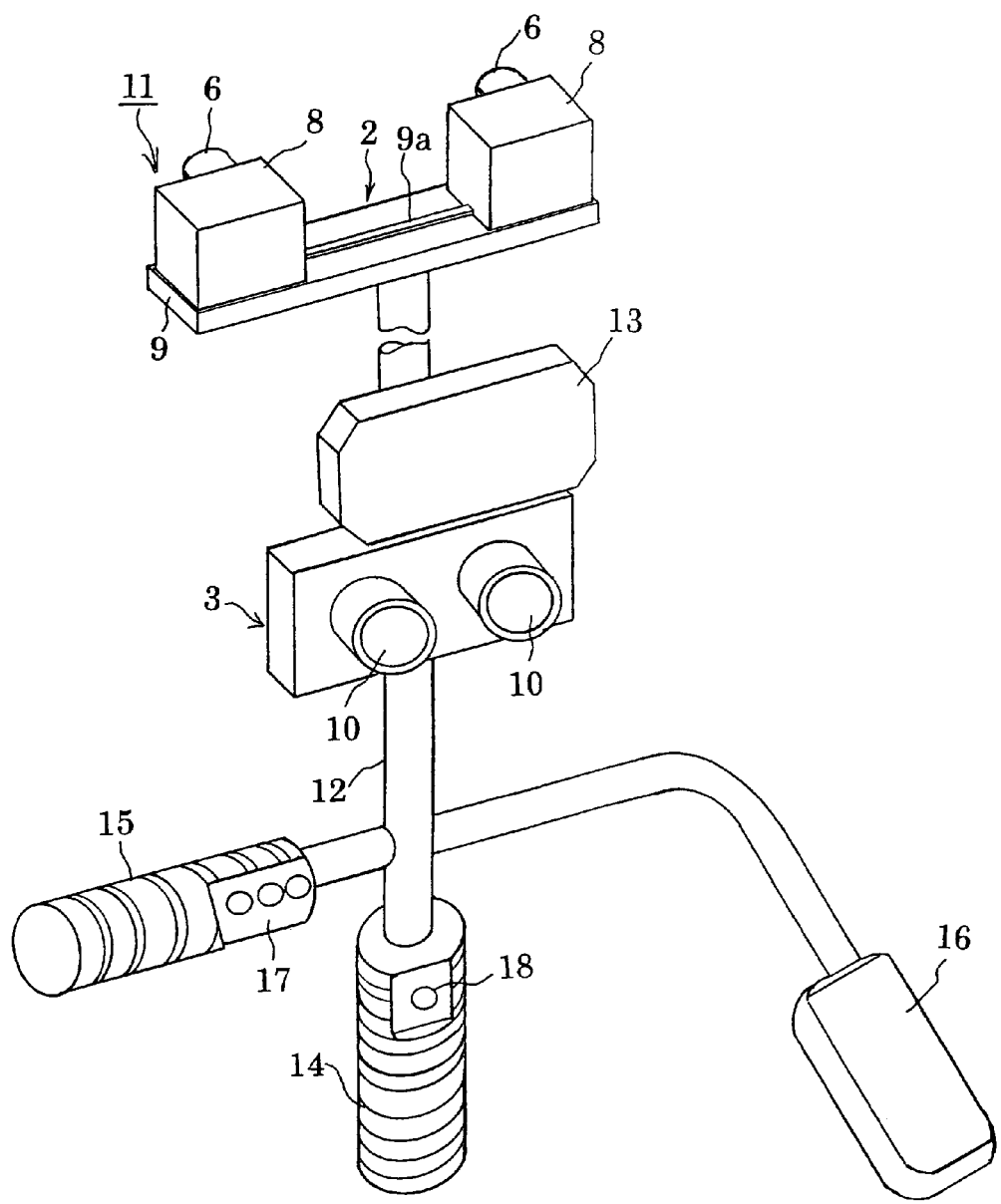
FIG. 2 is a perspective view showing the embodiment of the digital stereo camera of the invention.

FIG. 2 shows a system camera 11 obtained by developing the digital stereo camera 1, where the base 9 of the image capture unit 2 is attached to a top of a column 12, the stereo viewfinder 3 is mounted to an intermediate portion of the column 12 in a vertical direction, and a forehead pad 13 is mounted above the stereo viewfinder 3.

A vertical grip 14 and a horizontal grip 15 extending in a direction orthogonal thereto are provided on a lower portion of the column 12, and a shoulder pad 16 extends in a direction opposed to the horizontal grip 15 extending leftward. The horizontal grip 15 is provided with a control switch portion 17 including an actuation switch, a zooming operation switch, a focusing adjustment switch, an exposure adjustment switch, and other switch buttons, and the vertical grip 14 is attached with a photographing button 18. Though not illustrated, the forehead pad 13 and the shoulder pad 16 are respectively provided with position adjusting mechanisms. A photographer adjusts a position of the forehead pad 13 such that the forehead pad 13 contacts with the forehead of the photographer in a state that he/she grips the horizontal grip 15 and the vertical grip 14 with his/her left and right hands respectively and he/she looks through the eyepiece lenses 10 of the stereo viewfinder 3, and he/she also adjusts the shoulder pad 16 to a proper position. When he/she turn on the actuation switch on the control switch portion 17 in this state, he/she can monitor an image in the stereo viewfinder 3 stably. When the photographer pushes the photographing button 18, data of images projected on the pair of left and right image capture devices can be written in the memory.

Figure 3:
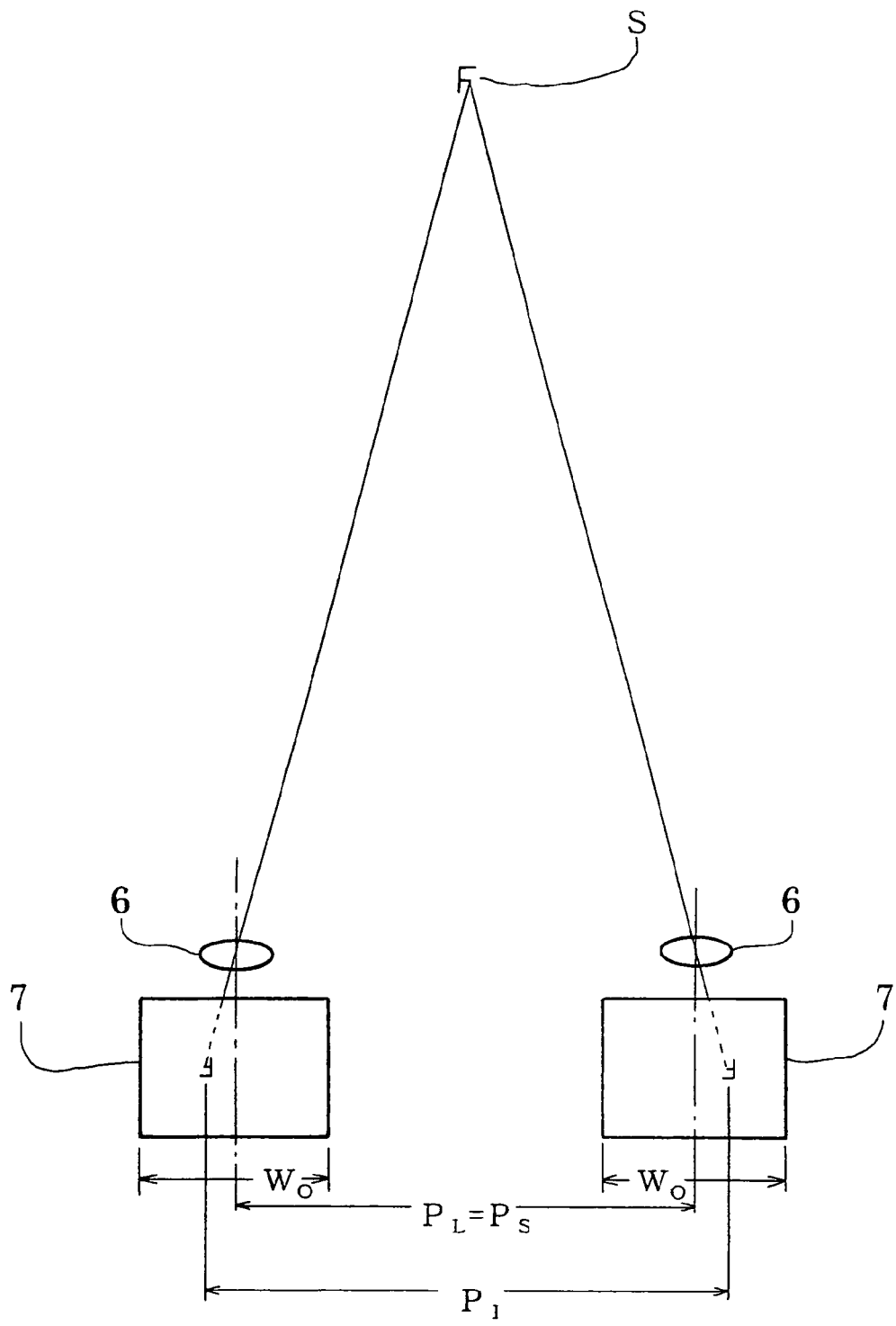
FIG. 3 is an explanatory diagram showing a parallax of the stereo camera.

FIG. 3 is a diagram for explaining a parallax in a stereo camera, which shows a state where a subject (a character F) in a near distance has been photographed. A distance $P_S$ between the centers of the left and right image capture devices 7 in the image capture unit is set to be equal to a distance $P_L$ between the optical axes of the left and right photographing lenses 6. When an infinite subject is photographed, since light rays at the same point on the infinite subject are incident on the left and right photographing lenses 6 in parallel to each other, a distance $P_I$ between the centers of left and right images focused on the left and right image capture devices 7 becomes equal to the distance $P_L$ between the optical axes of the left and right photographing lenses 6. On the other hand, as shown in FIG. 3, when a subject positioned in a finite distance is photographed, the distance $P_I$ between the centers of subject images projected on the left and right image capture devices 7 becomes larger than the distance $P_S$ between the centers of the left and right image capture devices 7 ($P_I > P_S$).

Figure 4:
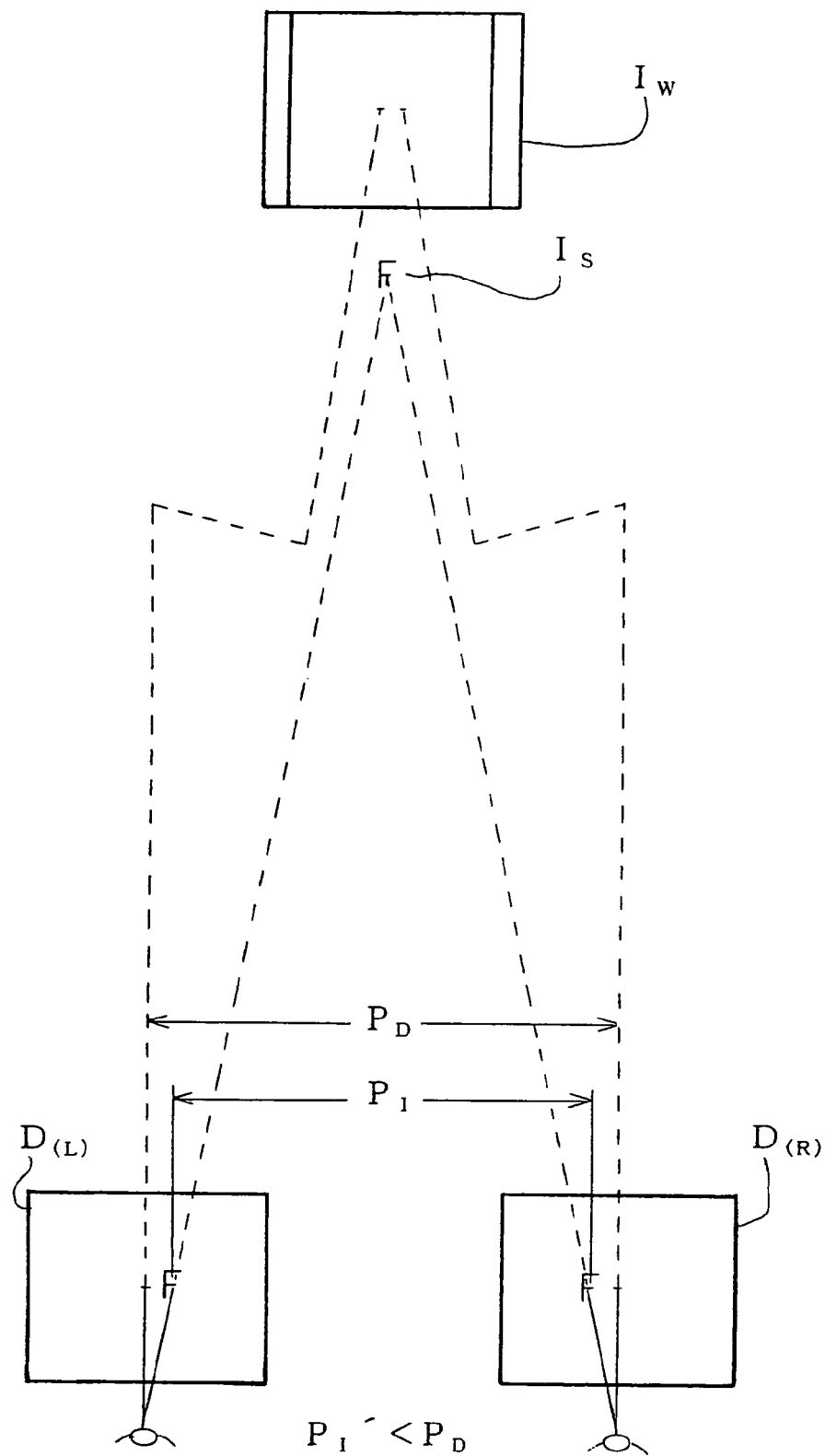
FIG. 4 is an explanatory diagram showing a stereoscopic image forming behavior of the stereo camera.

FIG. 4 shows a state (where the eyepiece lenses are omitted) that displaying is performed such that entire widths of original image data elements projected on the image capture devices 7 shown in FIG. 3 are coincident with widths of screens of left and right liquid crystal displays D and the screens are viewed in a stereoscopic manner. Since inverted images projected on the image capture devices of the stereo camera are displayed on the liquid crystal displays D as erected images rotated by 180°, a distance $P_I'$ between the centers of left and right images becomes smaller than a distance PD between the centers of the left and right screens ($P_I' < P_D$).

When an observer views such a stereo photograph in a stereoscopic manner with his/her both eyes, a stereoscopic image Is appears in front of "stereo windows" Iw and the "stereo windows" Iw do not merge with each other and they appear doubly in an overlapping fashion, as shown in FIG. 4, so that the stereoscopic image becomes unnatural and difficult to see. Matching adjustment between left and right images must be performed in order to obtain a natural stereoscopic feeling.

In the stereo photograph, it is common to make adjustment such that a subject in the shortest distance appears at an equidistant position to a position of the "stereo window" or farther. In order that the subject appears in such a fashion, adjustment may be performed by the matching adjustment function of the stereo viewfinder described above such that the distance $P_I'$ between the centers of the images of the subject positioned at the shortest distance is equal to or larger than the distance $P_D$ between the centers of the left and right screens.

The matching adjustment function of the stereo viewfinder is shown in FIGS. 5A to 5D. FIG. 5A shows a state that near distance subject images (character F) on the image capture devices have been rotated to erected states by 180°, FIG. 5B shows image display regions on a pair of left and right liquid crystal displays during editing (whose aspect ratio is made narrower than that at a photographing time), FIG. 5C shows a state that the images shown in FIG. 5A have been displayed on the image display regions shown in FIG. 5B without offset, and FIG. 5D shows a state that the distance between the centers of left and right images is offset to the longest length by causing inner vertical sides of the left and right images to coincide with inner vertical sides of the image display regions.

A procedure for matching adjustment will be explained below. An image projected to the image capture devices 7 at a photographing time is being monitored in real time by the stereo viewfinder 3 provided with the pair of liquid crystal displays D.

When matching adjustment is performed, switching to an edition mode is performed by a mode switching switch, and when photographed images are edited, stereo photographs are sequentially displayed on the liquid crystal displays D (in any order) for each pair according to pressing operation on the image selection switch. Initial positions of images re-displayed during editing are not limited to specific ones, but when offset is set to zero, as shown in FIG. 5C, both left and right end portions of images exceed left and right sides of display frames on the liquid crystal displays to be shield (blacked out).

The matching adjustment is performed by a scroll operation key provided on the stereo viewfinder 3. Left and right images are symmetrically scrolled (offset) horizontally outward or inward in ranges shown in FIGS. 5C and 5D by pushing either of both ends of the scroll operation key in the same manner as a seesaw key for an ordinary electric zooming operation, so that they are adjusted to proper scrolling state. Thereafter, a set of left and right images displayed on the liquid crystal displays D are saved in the memory as data of stereo images on one sheet according to saving operation.

As the image display method during editing, there are a method which reduces a display frame dimension of the liquid crystal display D from a field ratio of 100% at a photographing time to a narrower width shown in FIG. 5B, and a method which enlarges an image with an actual display screen width $W_P$ which is narrower than a width $W_O$ of an original image on the image capture device to a width equal to a width $W_D$ of the liquid crystal display to display the image and sets a re-display width during editing after photographing to $W_D$.

When data of an original image with a width $W_O$ is recorded in the image memory at a photographing time, in the former method, an image can be monitored over its entire width at a photographing time, but a screen is reduced at a re-displaying time (at a time of matching adjustment). On the other hand, in the latter method, display where a screen at a re-displaying time has been enlarged to a width of the liquid crystal display is obtained at a photographing time instead of an entire display of a photographed image, but such an advantage can be obtained that a screen width at a matching adjustment time is not reduced. Thus, either of the methods may be adopted.

As the saving method of image data, there are a method which saves 100% image data of the image capture device and saves scroll data after matching adjustment separately, thereby making it possible to perform matching edition any times after photographing, and a method which saves data of an image horizontally scrolled at a photographing time. Though the latter method can reduce the data amount as compared with the former method, either of the methods can be adopted according to the degree of requirement for the matching edition function.

In the above embodiment, the constitution where two independent image capture device are mounted as the image capture unit has been explained, but such a constitution may be adopted that stereo images obtained through left and right photographing lenses is divided to two pieces on one image capture device.

In the above, the case that the distance $P_L$ between the optical axes of the left and right photographing lenses 6 is equal to the distance Ps between the centers of the left and right image capture devices 7 has been explained. In this case, as shown in FIG. 5C, the center of the screen on the liquid crystal display D in the horizontal direction is coincident with the center of the photographed image in the horizontal direction, so that both left and right ends of the photographed image are mashed equally in such a state that the infinite subject and the "stereo window" appear infinitely.

As shown in FIG. 5D, when the left and right images are scrolled to the outermost ends in outwardly moving directions, the mask amounts of the images in their inner sides become zero, so that the "stereo window" appears in the distance equal to the subject in the shortest focused distance. That is, since the offset adjustment range to the images is a range between the states shown in FIG. 5C and the state shown in FIG. 5D, the masked outer portions of the left and right images in FIG. 5C do not appear in the screen display ranges of the liquid crystal displays to become screen lost. In fact, even when an infinite subject is photographed, a more excellent stereoscopic effect can be obtained by adopting such a constitution that the "stereo window" appears in a finite distance, and the infinite subject appears beyond the "stereo window".

FIG. 6 is a diagram for explaining means for improving the above-described image loss or stereoscopic effect, where, assuming that selecting ranges (width $W_E$) during editing have been moved to inner ends of the left and right image capture devices on exposure faces of the image capture devices, the distance $P_L$ between the optical axes of the left and right photographing lenses is set to be smaller than the distance $P_E$ between the centers of the left and right edition selection ranges $W_E$ at that time.

FIG. 7A shows a case that images photographed by a camera shown in FIG. 6 have been re-displayed on the liquid crystal displays D of the stereo viewfinder 3 in an editing mode, where the outer ends of original image data with a width $W_O$ are coincident with the outer ends of the actual display screens $W_P$ of the displays. FIG. 7B shows actual display screens (width $W_P$) of the displays D in the edition mode. As shown in FIG. 7C, offsetting can be performed until the inner ends of the original image data with the width $W_O$ are coincident with the inner ends of the actual display screens $W_P$.

In FIG. 7A, in order that the infinite stereoscopic image F appears beyond the stereo windows, namely, the stereo windows appear in finite distance, a distance $P_I'$ between the centers of left and right images on the displays D may be set to be larger than a distance $P_{WP}$ between the centers of the actual display screens on the displays ($P_I' > P_{WP}$). When a close-in subject is photographed, it is necessary to set the distance $P_I'$ between the centers of left and right images on the displays D to be equal to the distance $P_{WP}$ between the centers of the actual display screens on the displays. Therefore, as shown in FIG. 7C, adjustment is conducted such that the distance $P_I'$ between the centers of the close-in subjects (character F) becomes equal to the distance $P_{WP}$ ($P_I' = P_{WP}$).

As shown in FIG. 6, since the images on the image capture devices 7 are inverted images, they are put in a positional relationship with images on the erecting finders, so that the image data selection ranges WE of the left and right image capture devices of the camera at an infinite photographing time move to the innermost ends of the entire widths Ws of the image capture devices.

A relationship between the image capture devices and the displays is in a proportional relationship of $W_O: W_S = W_P: W_E$. Therefore, when a distance between the centers of the data selection ranges $W_E$ on the image capture devices 7 of the camera shown in FIG. 6 is represented as $P_E$, the distance between the centers of the images on the left and right image capture devices 7 is represented as $P_I$, and the distance between the optical axes of the left and right photographing lenses 6 is represented as $P_L$, since light rays emitted from the same or one point in an infinite distance become parallel to each other when entering in the left and right photographing lenses 6, so that the distance between the centers of the left and right images becomes equal to the distance between the optical axes of the left and right photographing lenses 6, which results in $P_L = P_I < P_E$.

Figure 5:
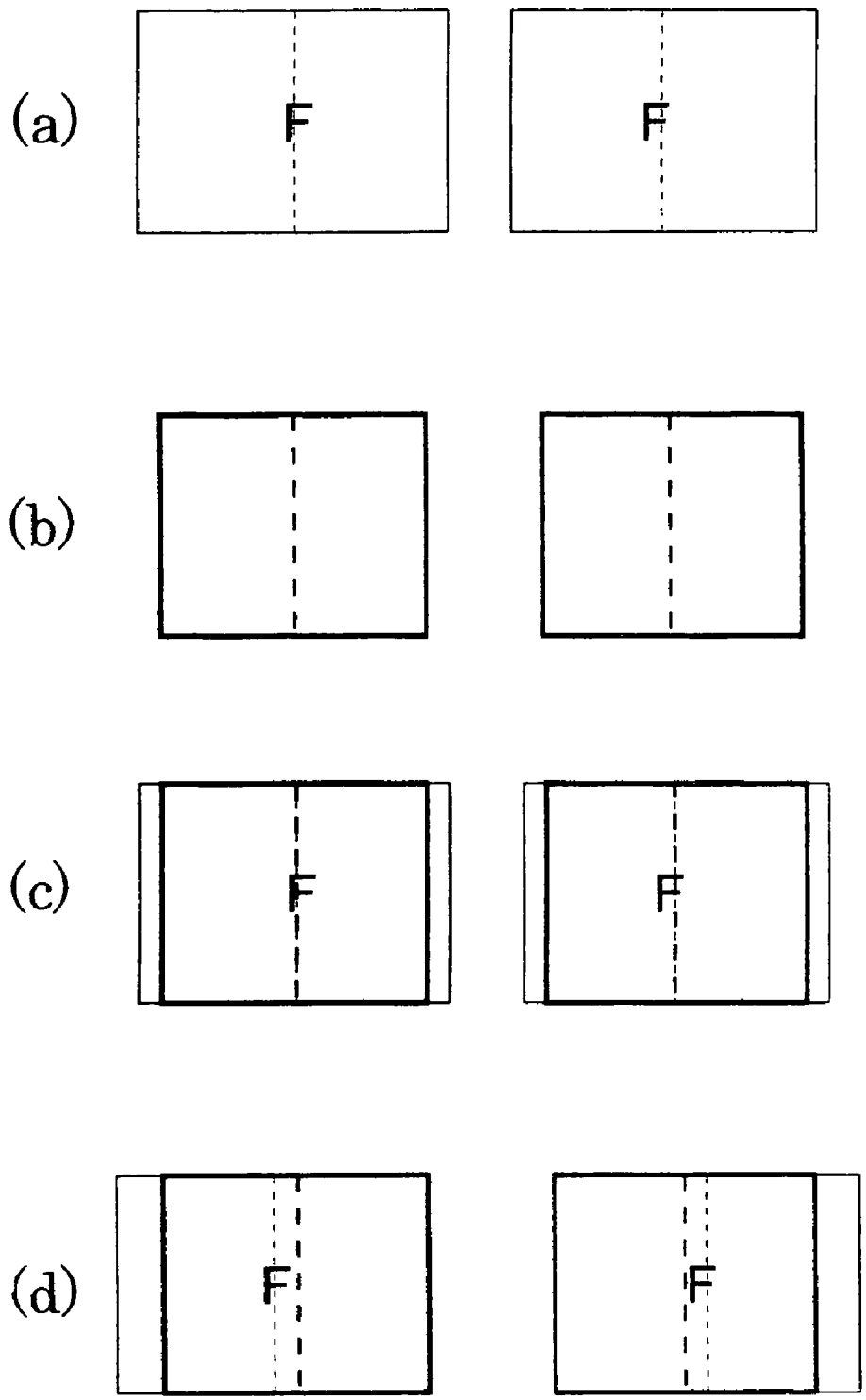
Figure 7:
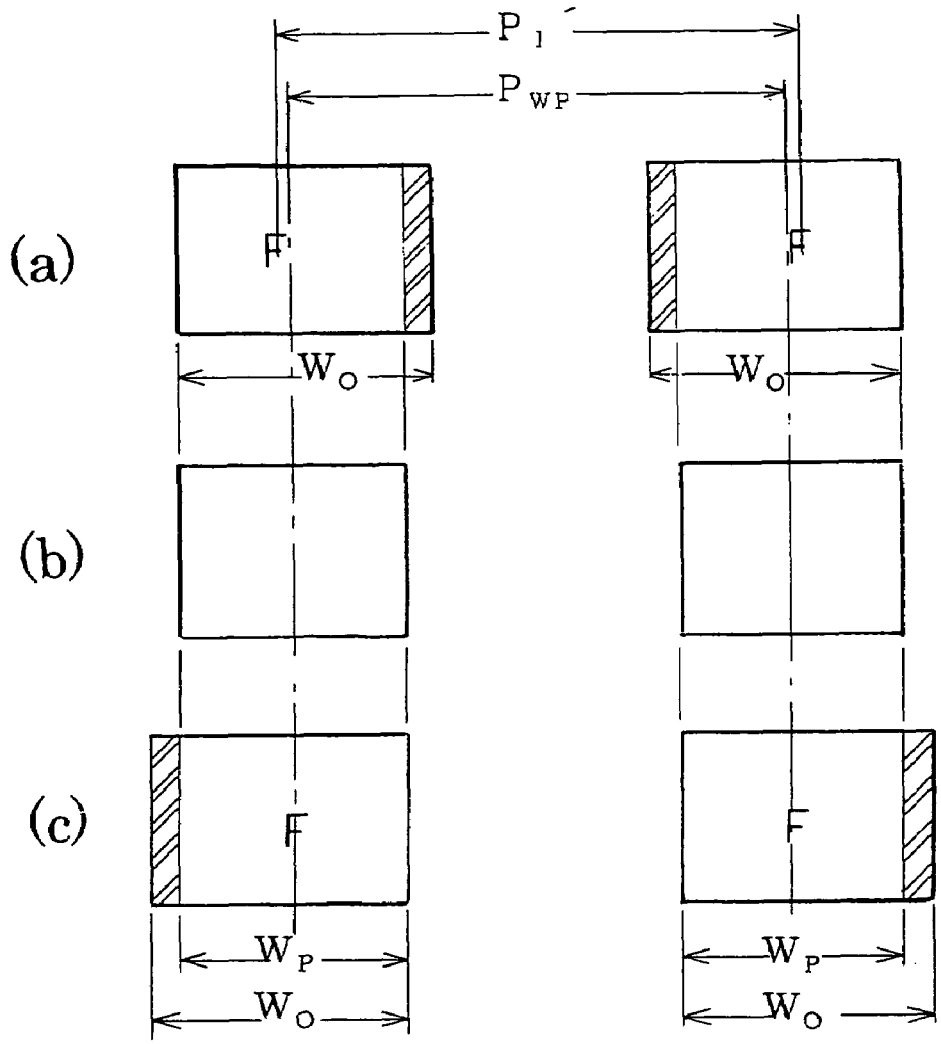

As described above, when the distance between the optical axes of the left and right photographing lenses 6 of the stereo camera is set to the above dimensional condition of the $P_L$, the image loss in the example shown in FIG. 5 is solved so that data for stereo photographs whose image losses have been reduced to the minimum can be obtained, as shown in FIG. 7.

Next, a case that patterns P including a plurality of vertical lines, shown in FIGS. 8A and 8B, are displayed on the liquid crystal displays D in an overlapping manner with images as means for improving visibility for determining goodness/badness about matching condition will be explained. The vertical line patterns P are positioned at equal positions on the left and right edition screens, and when a viewer or observer views the left and right screens with his/her both eyes, the left and right vertical line patterns P appears to be coincident with each other in the distance of the "stereo window". The distance between the centers of the left and right images can be adjusted such that all the subjects appear beyond the vertical line patterns P, so that goodness/badness about a stereoscopic feeling can be easily judged by simultaneously viewing both the images and the vertical line patterns P in a stereoscopic manner.

FIG. 8A represents a selection range (the state shown in FIG. 7A) from original image data $W_O$ when an adjustment value at a matching adjustment time is zero, and FIG. 8B represents a display range (the state shown in FIG. 7C) selected when the adjustment value is the maximum. Though re-displaying at the matching adjustment time may be performed in either direction by setting the state shown in FIG. 8A as an initial position or by setting the state shown in FIG. 8B as the initial position, it is preferable that matching adjustment is carefully repeated in both the directions.

FIGS. 8A and 8B illustrate both ends of an adjustment value range, but adjustment is often performed to a value between the range defined by FIG. 8A and FIG. 8B in fact. In such a case, since original images are masked on both sides of the actual display screen widths WD on both the left and right liquid crystal displays D, the left and right images can be wholly scrolled in the same or one direction according to a viewer's determination about whether there is an interesting subject in left or right stereoscopic fields performed while viewing a monitor during editing. The adjustment can be performed until the scrolling reaches a final end (both left and right ends) of either of a pair of left and right image data elements.

The above matching adjustment is performed by scrolling left and right images to display regions with a fixed width $W_D$ on the displays to change a distance between the centers of the left and right images, but a digital zooming operation (a technique for changing a reading ratio of video data stored in an image memory to enlarge display in a digital television or digital camera) which is pseudo zooming can be applied instead of the image scrolling, and such a constitution may be employed that the distance between the centers of images on the left and right displays is changed by digital zooming.

The image data edited by the above matching adjustment is stored in the memory as one sheet of image data including left and right images integrally, and it can be outputted to a digital silver halide print system, a computer, a printer, or the like at any time. In such a constitution that vertical line patterns P are displayed in an overlapping manner during editing, it is a matter of course that only the image data is stored at a time of image data storage without storing data of the vertical line patterns.

Since the above-described vertical line patterns P is useless except for matching adjustment, such a constitution may be adopted in the display control unit that they are displayed only when the scroll operation key is operated. Setting is performed such that displaying continues for several seconds after key operation or pattern display continues until a viewer or an operator releases his/her finger from the scroll adjustment key and the pattern display automatically disappears after matching adjustment, so that on/off operation of the pattern display is made unnecessary, which results in convenient use.

Next, a technique for facilitating a focal point adjustment operation of a digital stereo camera using liquid crystal displays as a viewfinder will be explained. In the stereo viewfinder in the stereo camera shown in FIG. 6, vertical line patterns P shown in FIG. 8A or 8B are displayed on the left and right liquid crystal displays under software control even at a photographing time. The distance $P_E$ between the centers of the image selection ranges $W_E$ on the left and right image capture devices is changed in an interlocking manner with focal point adjustment of the photographing lenses 6 at the photographing time so that the distance $P_I$ between the centers of the left and right subjects focused is caused to coincide with the distance $P_E$.

FIG. 9 illustrates a state that a near distance subject has been focused at a photographing time by the camera shown in FIG. 6, where the distance $P_I$ between the centers of near distance subject images is larger than the distance $P_L$ between the centers of the left and right photographing lenses 6, i.e., $P_I > P_L$, as described above.

In the state shown in FIG. 9, if the distance $P_E$ between the centers of the image selection ranges WE on the image capture devices 7 is set to the minimum distance like the distance $P_E$ between the centers in FIG. 6 and the vertical line patterns are displayed in the stereo view finder in an overlapping manner like the state shown in FIG. 8A, the subject (the character F) appears in a close range, as shown in FIG. 10. so that a photographer will feel considerably uncomfortable. In the state shown in FIG. 9, if the distance $P_I$ between the centers of the subject images is set to be equal to the distance $P_E$ between the centers of the selection ranges $W_E$ of the image capture devices ($P_E = P_I$), the vertical line patterns and the subject images appear in the same distance.

FIG. 11 illustrates that the image selection ranges are scrolled to meet the above $P_E = P_I$ (the selection ranges are moved in the directions in which the state shown in FIG. 8B is obtained), so that the distance $P_D$ between the centers of the left and right liquid crystal displays D and the distance $P_I'$ between the centers of the images displayed are caused to coincide with each other ($P_D = P_I'$). Thereby, the vertical line patterns appear in the same distance as the subject images in a stereoscopic view at a photographing time.

In order to set the stereo viewfinder such that the state of $P_E = P_I$ shown in FIG. 9 can be always obtained, when a movement amount of photographing lenses in optical axis directions at a time of focal point adjustment is represented as $\Delta f$, a focal length of each photographing lens is represented as f, a distance from a main point of each photographing lens to an object is represented as L, a distance between optical axes of left and right photographing lenses is represented as $P_L$, and a distance between the centers of images projected on left and right image capture devices is represented as $P_I$ in FIG. 9, the movement amount $\Delta f$ of the photographing lenses in the axial direction at a time of focal point adjustment is expressed as $\Delta f = f^2/(L-f)$, so that the distance $P_I$ between the centers of images projected on the left and right image capture devices is expressed as $P_I = P_L (1+\Delta f/f)$. Therefore, by controlling horizontal scroll amounts of left and right images in an interlocking manner while matching with focal point adjustment of the photographing lenses 6 so as to meet the conditions of $\Delta f$ and $P_I$ in the numerical equation, the stereoscopic image Is on the stereo viewfinder 3 appears in the same distance as the "stereo window" Iw, as shown in FIG. 11.

For example, when the photographing lenses 6 are moved and adjusted manually, setting can be performed such that the subject images appear at the equidistant positions to the collimation pattern on the stereo viewfinder by detecting positions of the lenses using an encoder, a potentiometer or the like and automatically adjusting the horizontal scroll amounts of the reading ranges $W_E$ of the original image data $W_O$ so as to meet the above conditions in an interlocking manner. When an autofocusing system is employed, the horizontal scroll amounts of the reading ranges $W_E$ of image data elements on the image capture devices may be automatically controlled by performing computation and distribution from the focused distance data so as to meet the above equations.

In the above embodiment, the vertical line pattern P is used as the collimation pattern, but the collimation pattern is not limited to the vertical line pattern. When equal shapes at equal positions appears on the left and right displays, for example, circular indexes can be used or combination of the vertical lines with the indexes can be used.

In a conventional ordinary camera, ranging means such as an auto-focus area or a reticle must be caused to coincide with a photographing target for focusing. In the system according to the present invention, however, since a focused state can be viewed over a whole field of the finder, it is unnecessary to perform such an operation for causing the reticle or the like to coincide with the target. This is especially important in a photographing scene where subjects overlap with one another in a multiplexing manner. Even in a case that a focusing mechanism for a camera according to the present invention is designed for auto-focusing system, since a subject distance focused can be viewed at a photographing time without changing framing, it is very convenient for use.

In the explanation about the matching adjustment during editing, there is a description that the subject image positioned at an infinite distance should appear beyond the "stereo window" in the stereo photograph. This is similarly applied to a stereoscopic view feeling in the finder when a collimation pattern is displayed in the finger at a photographing time.

The distance where the "stereo window" appears is preferably about 3 meters even at an infinite photographing time, but it may be set to, for example, 3 to 10 meters. In the stereo photograph, it is often preferable that photographing is performed in a pan-focus state, and photographing is often performed in such a condition that an aperture of a lens at a photographing time is throttled and focusing is fixed to a distance of about 3 to 5 meters, while focusing is conducted from a near view to a far view. At a near range photographing time (a close up state) within 1 meter, the subject image at the photographing time preferably appears at an equidistant position to the collimation pattern.

This is achieved by interlocking a focusing value ($\Delta f$ value) at a photographing time and the selection range of the finder display computed from the $\Delta f = f^2/(L-f)$ and $P_I = P_L (1+\Delta f/f)$ with each other such that, when focusing at a photographing time is adjusted to an infinite distance, an infinite image appears beyond a collimation pattern appearing at a distance of about 3 to 5 meters, and when focusing is adjusted to a near range within 1 meter or less, a subject image appears in an equidistance to the collimation pattern and configuring an operation control program such that $P_I$ shown in FIG. 11 meets $P_I'>P_D$ at an infinite time and $P_I'=P_D$ at a near range time.

Incidentally, a display color for the collimation pattern may be black, where it may be difficult to see in a dark environment or in a dark color subject. As a countermeasure to such a case, such a constitution may be employed that a function for performing switching between display colors of the collimation pattern is provided on the display control portion so that the display color can be switched between while color and black color, or such a constitution may be adopted that the photographing mode and the editing mode are discriminated from each other by differentiating color or shape between the collimation pattern at the photographing time and that at the editing time.

Since image data outputted from the image capture device can be outputted as a video signal at real time, when the digital stereo camera is provided with a video signal output terminal, a user or viewer can view live video by outputting a video signal from the video signal output terminal to an external 3-D monitor display or an external 3-D projector or record live video by inputting the video signal to a digital video recorder.

As a transmitting/receiving method of image data at this time, there are proposed a method which outputs a horizontally scrolled image data and a method which outputs 100% output data and scroll data which has been subjected to matching adjustment and perform scroll control on a reception side device provided with a scroll function to conduct displaying.

In the latter method, original image data is fed with a full-width size which does not include any image loss and it is automatically scroll-controlled based upon scroll data received on the reception side device to be displayed. When a switching system between an automatic scroll control and a manual scroll control is adopted in the reception side device, a scroll amount can be adjusted arbitrarily on the reception side.

When a data communication function such as USB or IEEE1394 is provided on a digital stereo camera and a data communication terminal in the stereo camera is connected to a data communication connector in a cellar or portable phone or a PHS via a data communication cable corresponding to these interface, radio communication of raw or photographed stereo still image data or stereo motion picture data can be performed between two digital stereo cameras via a telephone line. Radio video distribution to video devices such as a 3-D monitor display or a 3-D projector can be made possible. As the connection to the telephone line, such a constitution that the digital stereo camera is incorporated with a cellar phone module to be unitized with a cellar phone or an aspect of the digital stereo camera incorporated with a telephone modem has been also proposed.

The stereo image matching technique described above can be applied to a 3-D projector or a 3-D display of a direct view type. As contents of the technique is directed to application of the matching means in the digital stereo camera described above, though not illustrated, the contents will be understood easily in the following explanation made with reference to FIG. 3 to FIG. 11. Incidentally, the above 3-D projector or 3-D display includes a LCOS (Liquid Crystal on Silicon)/

The "stereo window" Iw described in the explanation about the digital stereo camera corresponds to a liquid display, a screen of a CRT, or a projection screen, and the left and right image capture devices 7 correspond to projection lenses of left and right projectors in the 3-D cinema system. Like the display region widths WE of the liquid displays D of the above-described stereo viewfinder 3 at a matching adjustment time, a left eye side image and a right eye side image with aspect ratios being narrower than aspect ratios of left and right original images (a state where one portions of original images in a widthwise direction have been masked) are projected from a pair of left and right projectors, or a left eye side image and a right eye side image with aspect ratios narrower than those of left and right original images are alternately displayed on electronic displays for each one field.

When a pair of left and right original images are horizontally scrolled symmetrically regarding the left and right from the state shown in FIG. 7A to the state shown in FIG. 7C by an operation unit or means such as a scroll operation key so that projection regions are selectively changed, a spacing between equal subject images of the left eye side image and of the right eye side image on the CRT or the projection screen is changed without movement of image frames on the CRT display or the projection screen, and matching state between left and right images can be viewed.

Data with scroll state edited can be written on an external storage medium such as a built-in HDD or a built-in DVD drive, a removable memory, or a removable disk device. Like an ordinary video editing system, any chapter or a frame between any two points can be designated and a matching state of a scene thereof can be edited, so that matching can be finely adjusted for each scene.

Figure 8:
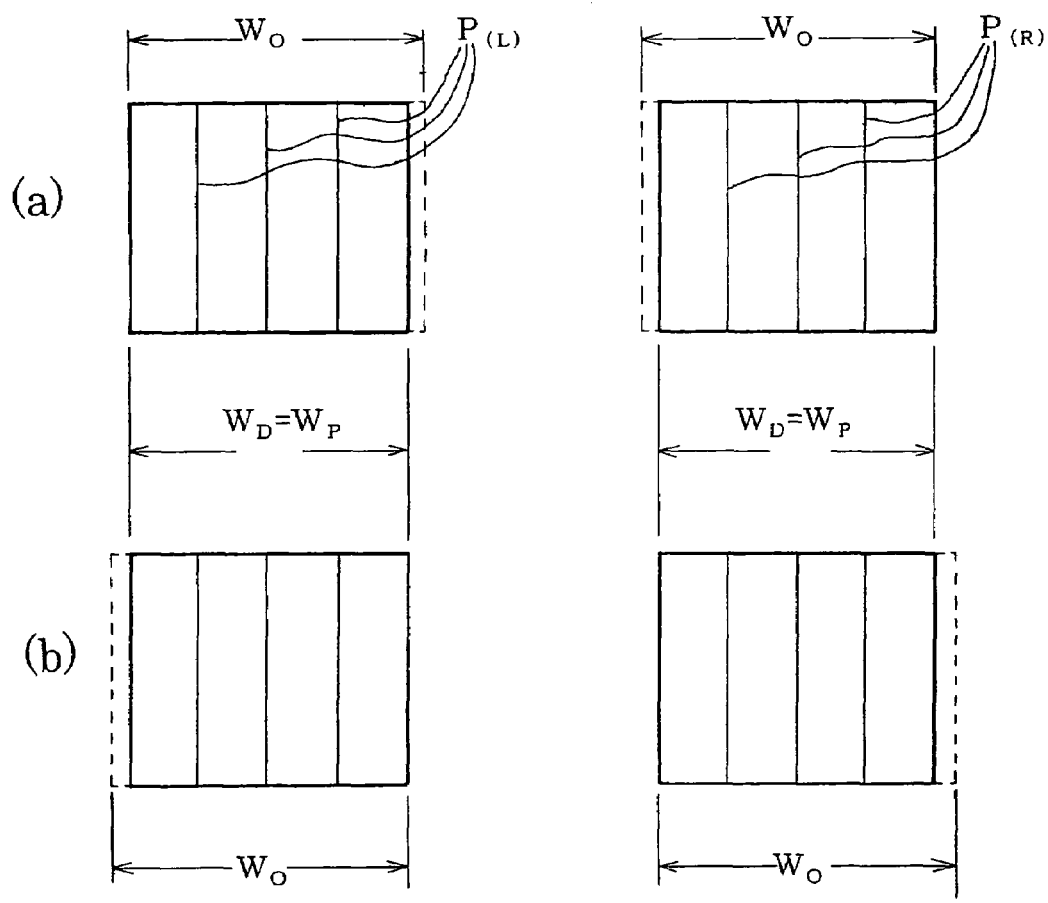

By projecting collimation patterns, each being constituted of a plurality of vertical lines or the like shown in FIG. 8, on left and right electronic devices or images on a projection screen, a relative distance between the projection screen and subject images or a stereoscopic feeling can be viewed easily, as described above.

By extracting any frame from stereo video data edited and saved in such an external storage medium as a built-in HDD or a built-in DVD drive, or a removable memory, or a removable disk device to output the frame as data for a sheet of left and right stereo photographs included in one sheet externally, a stereo photograph sheet can be produced from a motion picture source.

In order to reproduce stereo photographs photographed by a digital stereo camera in a 3-D projector or a 3-D display of a direct view type, video signal corresponding to one field are respectively produced from left and right image data elements, so that the left and right image data can be alternately displayed on one display or the left and right image data elements can be distributed to the left and right projectors for displaying.

Regarding commercially available DVD softwares or video tapes on which motion picture has been recorded, copying edited video data obtained by performing matching adjustment on video data using a virtual 3-D conversion software on another external recording medium may cause a problem about copy right. In this case, however, such a constitution may be adopted that an ID number and edition data (scroll data for matching) of a software, a chapter number or a frame number relating to the edition data, and the like are saved in a memory as a set of data files, the software ID number is read at a software reproducing time, so that a horizontal scroll amount to a reproducing image is sequentially controlled for each chapter or each designated scene based upon the edited data file having a corresponding ID number stored in the memory.

Image data adjusted according to matching edition in the digital stereo camera or digital stereo video camera described above, or a 3-D display or a 3-D projector can be outputted to a printer or a digital silver halide printer directly from the digital stereo camera or the like or by detaching an image recording medium such as a memory and loading the same on another reader device as data for one sheet including a pair of left and right stereo photographs to produce a stereo photo print.

In order to appreciate a stereo photo print using a stereo viewer, it is necessary to cut the stereo photo print printed or developed to a shape conforming with the stereo viewer. In order to appreciate a stereo photo print using a stereo viewer, it is desirable to provide a border (a gap) between left and right photographs on the stereo photo print to provide a blank portion with a fixed width between the left and right photographs.

When stereo photograph data is fed to a printer, the stereo photograph data composed with print data including a cutting guide frame serving as the border and an outer edge of the blank portion recorded in the memory is outputted, so that a relative position of a outer shape of the stereo photograph print and images is made clear by printing the cutting guide frame together with the photographs.

FIG. 12 shows one example of a stereo photo card. A stereo photo card 21 may be painted with a specific color or pattern on its inner side of a cutting guide frame 22 showing an outer shape of the stereo photo card 21 except for images 24L and 24R arranged in parallel through a border 23, so that the stereo photo card 21 having a fixed shape can be formed by cutting an outer edge of the cutting guide frame 22.

Incidentally, forming both left and right ends of the cutting guide frame 22 in an arc shape is for facilitating insertion and positioning to a holder portion of a stereo photo viewer. Data for the cutting guide frame line can be preliminarily stored in a memory in a printer so that such a control can be made that data is outputted together with frame data automatically added thereto at a stereo photo print time.

The unit or means for performing matching adjustment to stereo photographs in the stereo viewfinder 3 described above can be applied to not only the photographing apparatus or the reproducing apparatus, but also all printers including business digital silver halide printers to consumer printers. This is achieved by mounting two left and right monitor displays or one monitor display having a size allowing simultaneous display of a pair of left and right stereo photographs.

FIG. 13A shows one example of a printer 31 attached with a monitor display 32 (illustration of operation switches and the like is omitted), and FIG. 13B shows details of a monitor display portion. Flanges 33 are formed on both left and right sides of the monitor display 32, so that a stereo viewer (an eyepiece unit) 41 can be attached to and detached from the monitor display 32. The matching adjustment unit or means in the printer is similar to that in the digital stereo camera, and explanation thereof is omitted herein for avoiding duplication in explanation.

In order to view two screens on the monitor display 32 in a stereoscopic manner, it is necessary to provide a partition plate for partitioning left and right fields (when there is not a partition, viewing fields of left and right eyes cross each other). In addition thereto, eyepiece lenses are also required. In the printer, however, even when a monaural print is displayed in an enlarged manner or when many photographs are displayed in an indexing manner, the partition plate or the eyepiece lenses will get in the way during working for such a processing.

FIG. 14 shows a stereo viewer 41 which is attachable to and detachable from a portion of the monitor display 32 of the printer 31. The stereo viewer 41 is provided with a lens board portion 42 and a print holder portion 43, a pair of left and right eyepiece lenses 41L and 41R are attached to the lens board portion 42, and a pair of left and right windows 45L and 46R corresponding to stereo images projected on the monitor display 32 in the printer 31 shown in FIG. 13. are provided on the print holder portion 43.

The lens board portion 42 and the print holder portion 43 are respectively provided their central portions in their horizontal directions with partition plates 46 and 47. The lens board portion 42 and the print holder portion 43 are coupled slidably to each other by inserting the partition plate 47 of the print holder portion 43 into the partition plate 46 with a box-like section of the lens board portion 42, so that diopter adjustment is performed by causing the lens board portion 42 and the print holder portion 43 to approach to and separate from each other, and a spacing therebetween is fixed by a lock screw 48.

Vertical grooves 49 corresponding to the flanges 33 of the monitor display 32 in the printer 31 are formed on inner wall faces of left and right ends on a back face of the print holder portion 43, and the stereo viewer 41 can be attached to the monitor display 32 in the printer 31 by engagement of the vertical grooves 49 with the flanges 33. When the stereo viewer 41 is detached, a stereo photo print is inserted to the vertical grooves 49 of the print holder portion 43 of the stereo viewer 41 from the above so that the print can be appreciated by a viewer or an observer. Incidentally, steps are provided on portions of the vertical grooves 49 to back faces of the windows 45L and 45R of the print holder portion 43. Therefore, when a stereo photo print is inserted into the grooves, an obverse thereof does not come in contact with the back faces of the windows 45L and 45R so that the stereo photo print is prevented from being injured. FIG. 15 shows a stereo viewer 41 of another embodiment. Various aspects including a shape of the stereo viewer 41 where an upper side portion of the print holder portion 43 has been removed in this manner can be proposed.

Incidentally, the present invention is not limited to the above embodiments, and various modifications can be adopted within technical scope and sprite of the present invention. Of course, these modifications are also included in present invention.

I claim:

1. A digital stereo camera/digital stereo video camera which is provided with a pair of left and right photographing optical systems, one or two image capture devices which individually receive a pair of images through the pair of photographing optical systems, a pair of left and right electronic displays which individually display a pair of images projected on the one or two image capture devices in an erecting manner, and an eyepiece lens, comprising:

a unit that, when photographed images are displayed on the pair of left and right electronic display, sets aspect ratios of images projected on the one or two image capture devices to be narrower than aspect ratios of image display regions on the electronic displays to perform displaying while masking one portion of the images on the one or two image capture devices;

a manual scrolling unit that horizontally scrolls images on the pair of left and right electronic displays symmetrically regarding the left and right to change an spacing between equal subject images on the left and right image display regions; and a unit that saves image data equal to a display image horizontally scrolled arbitrarily as a set of stereo image data elements and a unit that outputs the set of stereo image data elements externally.

2. A digital stereo camera/digital stereo video camera according to claim 1, wherein the data saving unit and the externally outputting unit are configured so as to save data of original images projected on the pair of image capture devices and scroll data obtained when horizontal scrolling is arbitrarily performed and output the same externally.

3. A digital stereo camera/digital stereo video camera according to claim 1, wherein, when a spacing between equal subject images on the pair of left and right image display regions is reduced symmetrically regarding the left and right by the manual scrolling unit and outside ends of respective photographed images are caused to coincide with outside ends of the image display regions on the electronic displays, a distance between optical axes of the left and right photographing lens is set such that a distance between infinite subject images on the left and right image display regions is larger than a distance between the centers of the left and right image display regions.

4. A digital stereo camera/digital stereo video camera according to claim 1, further comprising a display control unit which horizontally scrolls left and right display images on the electronic displays symmetrically with the left and right in an interlocking manner with focusing of the photographing lens to control a horizontal scroll amount such that a distance between the centers of equal subject images positioned on focused focal lengths on the left and right image display regions on the electronic displays is equal to a distance between the centers of the left and right image display regions.

5. A digital stereo camera/digital stereo video camera according to claim 1, wherein the left and right display images on the electronic displays are horizontally scrolled symmetrically with the left and right in an interlocking manner with focusing of the photographing lens, and a horizontal scroll amount is controlled such that, when the focused focal length is about 1 meter or farther, the distance between the centers of the equal subject images positioned at the focused focal lengths on the left and right image display regions on the electronic displays is larger than the distance between the centers of the left and right image display regions, and when the focused focal length is less than about 1 meter, the distance between the centers of the equal subject images positioned at the focused focal lengths become equal to the distance between the centers of the left and right image display regions.

6. A digital stereo camera/digital stereo video camera according to claim 1, further comprising a unit that displays collimation patterns with equal shapes and equal positions on the left and right electronic displays in an overlapping manner with images during image editing.

7. A digital stereo camera/digital stereo video camera according to claim 6, wherein each collation pattern is constituted of a plurality of vertical lines.

8. A digital stereo camera/digital stereo video camera according to claim 6, further comprising a unit that saves image data which does not include a display signal for the collimation pattern as a set of stereo image data elements and a unit which outputs the image data externally.

9. A digital stereo camera/digital stereo video camera according to claim 6, further comprising a display control unit which senses operation start of an operation switch or an operation key provided on the manual scroll unit to display the collimation pattern and stops displaying the collimation pattern after the operation switch or the operation key is released or after a predetermined time elapses after the operation start.

10. A digital stereo camera/digital stereo video camera according to claim 1, further comprising one of a data communication interface connected to a cellar phone, a cellar phone module, and a telephone modem incorporated in the digital stereo camera/digital stereo video camera, wherein transmission and reception of data can be performed through a telephone line.

11. A digital stereo camera/digital stereo video camera according to claim 1, wherein an image capture unit provided with the pair of left and right photographing optical systems and image capture devices of two systems and a stereo viewfinder provided with the pair of left and right electronic displays and eyepiece lenses are attachably/detachably provided, a control unit and an external storage device are provided in one of the image capture unit and the stereo viewfinder, or the control unit and the external storage device is provided separately therefrom, and the image capture unit and the stereo viewfinder, and the control unit and the external storage device are electrically connected so that communication of image data, a control signal and the like is performed.

12. A digital stereo camera/digital stereo video camera according to claim 1, further comprising a control unit that arranges images corresponding to the pair of left and right stereo image data elements in parallel and performs outputting as a pair of stereo image print data elements in an overlapping manner with data of a line or a pattern surrounding a pair of left and right images or a rectangular cutting guide frame obtained by painting.

13. A digital stereo camera/digital stereo video camera according to claim 12, wherein left and right end portions of the cutting guide frame are each formed in an arc shape.

14. A 3-dimensional display constituted such that a left eye side image and a right eye side image are alternately displayed for each one field in an interlace manner using an electronic display such as a CRT or a PDP and an image on the display can be viewed in a stereoscopic manner using a viewer provided with a pair of left and right liquid crystal shutters opened and closed in synchronization with a field switching timing of the display, comprising:
  a unit which sets an aspect ratio of a display image to be narrower than an aspect ratio of a screen corresponding to original motion picture data to perform projection while masking a portion of the original motion picture;
  a manual scroll unit which horizontally scrolls a left eye side image and a right eye side image on a display region on the electronic display symmetrically regarding the left and right to change a distance between equal subject images on the left eye side image and the right eye side image; and
  an edition data saving unit which writes motion picture data put in a state equal to the left eye side image and the right eye side image horizontally scrolled arbitrarily in an external storage device as a set of stereo video data elements.

15. A 3-dimensional display according to claim 14, further comprising a unit which projects a collimation pattern on left and right electronic displays or a projection screen in an overlapping manner with an image during editing of the motion picture.

16. A 3-dimensional display according to claim 14, wherein the collimation pattern is constituted of a plurality of vertical lines.

17. A 3-dimensional display according to claim 14, further comprising an edition point designating unit which can perform the motion picture edition for each frame.

18. A 3-dimensional display according to claim 14, further comprising an image data outputting unit which outputs any frame in the stereo video data edited and saved as a pair of left and right stereo photograph data elements externally.

19. A 3-dimensional projector which uses liquid crystal projectors of two right and left systems whose polarizing directions of emitted lights are orthogonal to each other, digital micro-mirror device (trademark) system projectors of two left and right systems attached with linear polarizing filters whose polarizing directions are orthogonal to each other, or the like to project a left eye side image and a right eye side image on a projection screen from the projectors of the two left and right systems in an overlapping manner, where an image on the projection screen is viewed in a stereoscopic manner using glasses provided with linear polarizing filters where polarizing directions are orthogonal to each other at both left and right eyes/a 3-dimensional projector which uses liquid crystal projectors of two right and left systems attached with circularly polarizing filters whose rotating directions of circularly polarized lights are reverse to each other, digital micro-mirror device (trademark) system projectors of two left and right systems attached with circularly polarizing filters whose rotating directions of circularly polarized lights are reverse to each other, or the like to project a left eye side image and a right eye side image on a projection screen from the projectors of the two left and right systems in an overlapping manner, where an image on the projection screen is viewed in a stereoscopic manner using glasses provided with circular polarizing filters where rotating directions of circular polarized lights are reverse to each other at both left and right eyes, comprising:
   a unit which sets an aspect ratio of a display image to be narrower than an aspect ratio of a screen corresponding to original motion picture data to perform projection while masking a portion of the original motion picture;
   a manual scroll unit which horizontally scrolls a left eye side image and a right eye side image on the projection screen symmetrically regarding the left and right to change a distance between equal subject images on the left eye side image and the right eye side image on the projection screen; and
   an edition data saving unit which writes motion picture data put in a state equal to the left eye side image and the right eye side image horizontally scrolled arbitrarily in an external storage device as a set of stereo video data elements.

20. A 3-dimensional projector according to claim 19, further comprising a unit which projects a collimation pattern on left and right electronic displays or a projection screen in an overlapping manner with an image during editing of the motion picture.

21. A 3-dimensional projector according to claim 19, wherein the collimation pattern is constituted of a plurality of vertical lines.

22. A 3-dimensional projector according to claim 19, further comprising an edition point designating unit which can perform the motion picture edition for each frame.

23. A 3-dimensional projector according to claim 19, further comprising an image data outputting unit which outputs any frame in the stereo video data edited and saved as a pair of left and right stereo photograph data elements externally.

24. A printer which produces one sheet of stereo photo print on which a pair of left and right images have been displayed in parallel based upon stereo image data constituted of a pair of left and right image data elements, and which is provided with one or a pair of left and right electronic displays which display a pair of left and right images corresponding a set of stereo image data elements stored in a printer memory in an erected state and in parallel at a spacing approximately equal to a spacing between a left eye and a right eye of a human, comprising:
   a unit which sets an aspect ratio of an image on the electronic display to be narrower than an aspect ratio of an image corresponding to stereo image data to perform displaying while masking a portion of an original image;
   a manual scrolling unit which horizontally scrolls a pair of left and right images on the electronic display symmetrically regarding the left and right to change a spacing between equal subject images on the left and right images; and
   an edition data writing unit which writes image data in a state equal to a display image arbitrarily scrolled in the printer memory as a set of stereo image print date elements.

25. A printer according to claim 24, further comprising a unit which displays collimation patterns with equal shapes and equal positions on left and right image display regions on the electronic display during the image editing in an overlapping manner on images.

26. A printer according to claim 25, wherein each of the collimation patterns is constituted of a plurality of vertical lines.

27. A printer according to claim 24, further comprising a control unit which prints data of a line or a pattern surrounding a pair of left and right images, or a rectangular cutting guide frame obtained by painting in an overlapping manner on stereo image print data constituted of the pair of left and right images.

28. A printer according to claim 27, where left and right end portions of the cutting guide frame are each formed in an arc shape.

29. A printer according to claim 24, wherein the printer is connected with an external storage device such as a removable memory or a removable disk so as to be capable of reading, editing and writing image data.

30. A printer according to claim 24, wherein a partitioning plate which isolates left and right images from each other visually is fixedly or attachably/detachably provided on one or a pair of left and right electronic displays which display a pair of left and right images corresponding a set of stereo photograph data elements stored in a printer memory in an erected state and in parallel at a spacing approximately equal to a spacing between a left eye and a right eye of a human.

31. A printer according to claim 24, wherein a pair of left and right eyepiece lenses are arranged on a front face of one or a pair of left and right electronic displays which display a pair of left and right images corresponding a set of stereo photograph data elements stored in a printer memory in an erected state and in parallel at a spacing approximately equal to a spacing between a left eye and a right eye of a human.

32. A printer according to claim 24, wherein a lens board having a pair of left and right eyepiece lenses is attachably/detachably disposed on a front face of the one or the pair of left and right electronic displays.

* * * * *